US007185266B2

(12) United States Patent
Blightman et al.

(10) Patent No.: US 7,185,266 B2
(45) Date of Patent: Feb. 27, 2007

(54) NETWORK INTERFACE DEVICE FOR ERROR DETECTION USING PARTIAL CRCS OF VARIABLE LENGTH MESSAGE PORTIONS

(75) Inventors: Stephen E. J. Blightman, San Jose, CA (US); Daryl D. Starr, Milpitas, CA (US); Clive M. Philbrick, San Jose, CA (US)

(73) Assignee: Alacritech, Inc., San Jose, CA (US)

( * ) Notice: Subject to any disclaimer, the term of this patent is extended or adjusted under 35 U.S.C. 154(b) by 473 days.

(21) Appl. No.: 10/367,147

(22) Filed: Feb. 12, 2003

(65) Prior Publication Data
US 2004/0158793 A1 Aug. 12, 2004

(51) Int. Cl.
*H03M 13/00* (2006.01)

(52) U.S. Cl. .................................... 714/776
(58) Field of Classification Search ............. 371/30, 371/35, 53, 48; 710/52; 714/766
See application file for complete search history.

(56) References Cited

U.S. PATENT DOCUMENTS

| 4,366,538 | A |   | 12/1982 | Johnson et al. ........... 364/200 |
| 4,589,063 | A |   | 5/1986 | Shah et al. .................. 710/8 |
| 4,991,133 | A |   | 2/1991 | Davis et al. .............. 364/900 |
| 5,056,058 | A |   | 10/1991 | Hirata et al. ............. 709/230 |
| 5,058,110 | A |   | 10/1991 | Beach et al. ............ 370/85.6 |
| 5,097,442 | A |   | 3/1992 | Ward et al. ................ 365/78 |
| 5,163,131 | A |   | 11/1992 | Row et al. ............... 395/200 |
| 5,212,778 | A |   | 5/1993 | Dally et al. ............... 395/400 |
| 5,280,477 | A |   | 1/1994 | Trapp ........................ 370/85.1 |
| 5,289,580 | A |   | 2/1994 | Latif et al. ................ 395/275 |
| 5,303,344 | A |   | 4/1994 | Yokoyama et al. ......... 395/200 |
| 5,410,546 | A | * | 4/1995 | Boyer et al. ............... 714/763 |
| 5,412,782 | A |   | 5/1995 | Hausman et al. ........... 395/250 |
| 5,448,566 | A |   | 9/1995 | Richter et al. ............. 370/94.1 |
| 5,485,579 | A |   | 1/1996 | Hitz et al. ............. 395/200.12 |
| 5,506,966 | A |   | 4/1996 | Ban ........................... 395/250 |
| 5,511,169 | A |   | 4/1996 | Suda ........................ 395/280 |

(Continued)

FOREIGN PATENT DOCUMENTS

WO   WO 98/50852   11/1998

(Continued)

OTHER PUBLICATIONS

Schwaderer et al., IEEE Computer Society Press publication entitled, "XTP in VLSI Protocol Decomposition for ASIC Implementation", from 15th Conference on Local Computer Networks, 5 pages, Sep. 30-Oct. 3, 1990.

(Continued)

*Primary Examiner*—Guy Lamarre
*Assistant Examiner*—Sam Rizk
(74) *Attorney, Agent, or Firm*—Mark Lauer; Silicon Edge Law Group LLP

(57) ABSTRACT

A device and method are disclosed for calculating a CRC on a message or block of data that has been divided into portions, by calculating a partial CRC corresponding to each of the portions and then combining the partial CRCs. The device and method are operable for portions that may have different lengths, and which may be received out of order.

48 Claims, 11 Drawing Sheets

U.S. PATENT DOCUMENTS

| | | | | |
|---|---|---|---|---|
| 5,517,668 A | 5/1996 | Szwerinski et al. | | 395/800 |
| 5,524,250 A | 6/1996 | Chesson et al. | | 395/775 |
| 5,548,730 A | 8/1996 | Young et al. | | 395/280 |
| 5,566,170 A | 10/1996 | Bakke et al. | | 370/60 |
| 5,588,121 A | 12/1996 | Reddin et al. | | 395/200.15 |
| 5,590,328 A | 12/1996 | Seno et al. | | 395/675 |
| 5,592,622 A | 1/1997 | Isfeld et al. | | 395/200.02 |
| 5,598,410 A | 1/1997 | Stone | | 370/469 |
| 5,619,650 A | 4/1997 | Bach et al. | | 395/200.01 |
| 5,629,933 A | 5/1997 | Delp et al. | | 370/411 |
| 5,634,099 A | 5/1997 | Andrews et al. | | 395/200.07 |
| 5,634,127 A | 5/1997 | Cloud et al. | | 395/680 |
| 5,642,482 A | 6/1997 | Pardillos | | 395/200.2 |
| 5,664,114 A | 9/1997 | Krech, Jr. et al. | | 395/200.64 |
| 5,671,355 A | 9/1997 | Collins | | 395/200.2 |
| 5,678,060 A | 10/1997 | Yokoyama et al. | | 709/212 |
| 5,692,130 A | 11/1997 | Shobu et al. | | 395/200.12 |
| 5,699,317 A | 12/1997 | Sartore et al. | | 395/230.06 |
| 5,701,434 A | 12/1997 | Nakagawa | | 395/484 |
| 5,701,516 A | 12/1997 | Cheng et al. | | 395/842 |
| 5,727,142 A | 3/1998 | Chen | | 395/181 |
| 5,749,095 A | 5/1998 | Hagersten | | 711/141 |
| 5,751,715 A | 5/1998 | Chan et al. | | 370/455 |
| 5,752,078 A | 5/1998 | Delp et al. | | 395/827 |
| 5,758,084 A | 5/1998 | Silverstein et al. | | 395/200.58 |
| 5,758,089 A | 5/1998 | Gentry et al. | | 395/200.64 |
| 5,758,186 A | 5/1998 | Hamilton et al. | | 395/831 |
| 5,758,194 A | 5/1998 | Kuzma | | 395/886 |
| 5,771,349 A | 6/1998 | Picazo, Jr. et al. | | 395/188.01 |
| 5,778,013 A | 7/1998 | Jedwab | | 714/807 |
| 5,790,804 A | 8/1998 | Osborne | | 709/245 |
| 5,794,061 A | 8/1998 | Hansen et al. | | 395/800.01 |
| 5,802,258 A | 9/1998 | Chen | | 395/182.08 |
| 5,802,580 A | 9/1998 | McAlpine | | 711/149 |
| 5,809,328 A | 9/1998 | Nogales et al. | | 395/825 |
| 5,812,775 A | 9/1998 | Van Seters et al. | | 395/200.43 |
| 5,815,646 A | 9/1998 | Purcell et al. | | 395/163 |
| 5,878,225 A | 3/1999 | Bilansky et al. | | 395/200.57 |
| 5,898,713 A | 4/1999 | Melzer et al. | | 371/53 |
| 5,913,028 A | 6/1999 | Wang et al. | | 395/200.33 |
| 5,930,830 A | 7/1999 | Mendelson et al. | | 711/171 |
| 5,931,918 A | 8/1999 | Row et al. | | 709/300 |
| 5,935,205 A | 8/1999 | Murayama et al. | | 709/216 |
| 5,937,169 A | 8/1999 | Connery et al. | | 395/200.8 |
| 5,941,969 A | 8/1999 | Ram et al. | | 710/128 |
| 5,941,972 A | 8/1999 | Hoese et al. | | 710/129 |
| 5,950,203 A | 9/1999 | Stakuis et al. | | 707/10 |
| 5,991,299 A | 11/1999 | Radogna et al. | | 370/392 |
| 5,996,024 A | 11/1999 | Blumenau | | 709/301 |
| 6,005,849 A | 12/1999 | Roach et al. | | 370/276 |
| 6,009,478 A | 12/1999 | Panner et al. | | 710/5 |
| 6,016,513 A | 1/2000 | Lowe | | 709/250 |
| 6,021,446 A | 2/2000 | Gentry et al. | | 709/303 |
| 6,021,507 A | 2/2000 | Chen | | 714/2 |
| 6,026,452 A | 2/2000 | Pitts | | 710/56 |
| 6,034,963 A | 3/2000 | Minami et al. | | 370/401 |
| 6,038,562 A | 3/2000 | Anjur et al. | | 707/10 |
| 6,044,438 A | 3/2000 | Olnowich | | 711/130 |
| 6,047,323 A | 4/2000 | Krause | | 709/227 |
| 6,047,356 A | 4/2000 | Anderson et al. | | 711/129 |
| 6,057,863 A | 5/2000 | Olarig | | 345/520 |
| 6,061,368 A | 5/2000 | Hitzelberger | | 370/537 |
| 6,065,096 A | 5/2000 | Day et al. | | 711/114 |
| 6,070,200 A | 5/2000 | Gates et al. | | 710/20 |
| 6,101,555 A | 8/2000 | Goshey et al. | | 709/321 |
| 6,141,705 A | 10/2000 | Anand et al. | | 710/15 |
| 6,145,017 A | 11/2000 | Ghaffari | | 710/5 |
| 6,157,955 A | 12/2000 | Narad et al. | | 709/228 |
| 6,172,980 B1 | 1/2001 | Flanders et al. | | 370/401 |
| 6,173,333 B1 | 1/2001 | Jolitz et al. | | |
| 6,202,105 B1 | 3/2001 | Gates et al. | | 710/20 |
| 6,226,680 B1 | 5/2001 | Boucher et al. | | 709/230 |
| 6,246,683 B1 | 6/2001 | Connery et al. | | 370/392 |
| 6,247,060 B1 | 6/2001 | Boucher et al. | | 709/238 |
| 6,279,051 B1 | 8/2001 | Gates et al. | | 710/20 |
| 6,298,403 B1 | 10/2001 | Suri et al. | | 710/100 |
| 6,334,153 B2 | 12/2001 | Boucher et al. | | 709/230 |
| 6,345,301 B1 | 2/2002 | Burns et al. | | 709/230 |
| 6,356,951 B1 | 3/2002 | Gentry | | 709/250 |
| 6,389,468 B1 | 5/2002 | Muller et al. | | 709/226 |
| 6,389,479 B1 | 5/2002 | Boucher et al. | | 709/243 |
| 6,421,742 B1 | 7/2002 | Tillier | | 710/1 |
| 6,427,169 B1 | 7/2002 | Elzur | | 709/224 |
| 6,434,651 B1 | 8/2002 | Gentry | | 710/260 |
| 6,449,656 B1 | 9/2002 | Elzur et al. | | 709/236 |
| 6,453,360 B1 | 9/2002 | Muller et al. | | 709/250 |
| 6,480,489 B1 | 11/2002 | Muller et al. | | 370/389 |
| 6,526,446 B1 | 2/2003 | Yang et al. | | 709/230 |
| 6,681,364 B1 * | 1/2004 | Calvignac et al. | | 714/776 |
| 2001/0004354 A1 | 6/2001 | Jolitz | | 370/328 |
| 2001/0013059 A1 | 8/2001 | Dawson et al. | | 709/217 |
| 2001/0014892 A1 | 8/2001 | Gaither et al. | | 707/200 |
| 2001/0014954 A1 | 8/2001 | Purcell et al. | | 714/4 |
| 2001/0025315 A1 | 9/2001 | Jolitz | | 709/231 |
| 2001/0048681 A1 | 12/2001 | Bilic et al. | | 370/389 |
| 2001/0053148 A1 | 12/2001 | Bilic et al. | | 370/389 |
| 2003/0066011 A1 | 4/2003 | Oren | | 714/758 |
| 2003/0165160 A1 | 9/2003 | Minami et al. | | 370/466 |
| 2004/0049727 A1 * | 3/2004 | Wang | | 714/766 |
| 2004/0054814 A1 * | 3/2004 | McDaniel | | 709/250 |
| 2004/0153578 A1 * | 8/2004 | Elzur | | 709/250 |

FOREIGN PATENT DOCUMENTS

| | | |
|---|---|---|
| WO | WO 99/04343 | 1/1999 |
| WO | WO 99/65219 | 12/1999 |
| WO | WO 00/13091 | 3/2000 |
| WO | WO 01/04770 | 1/2001 |
| WO | WO 01/05107 | 1/2001 |
| WO | WO 01/05116 | 1/2001 |
| WO | WO 01/05123 | 1/2001 |
| WO | WO 01/40960 | 6/2001 |

OTHER PUBLICATIONS

Beach, Bob, IEEE Computer Society Press publication entitled, "UltraNet: An Architecture for Gigabit Networking", from 15th Conference on Local Computer Networks, 18 pages, Sep. 30-Oct. 3, 1990.

Chesson et al., IEEE Syposium Record entitled, "The Protocol Engine Chipset", from Hot Chips III, 16 pages, Aug. 26-27, 1991.

Maclean et al., IEEE Global Telecommunications Conference, Globecom '91, presentation entitled, "An Outboard Processor for High Performance Implementation of Transport Layer Protocols", 7 pages, Dec. 2-5, 1991.

Ross et al., IEEE article entitled "FX1000: A high performance single chip Gigabit Ethernet NIC", from Compcon '97 Proceedings, 7 pages, Feb. 23-26, 1997.

Strayer et al., "Ch. 9: The Protocol Engine" from XTP: The Transfer Protocol, 12 pages, Jul. 1992.

Publication entitled "Protocol Engine Handbook", 44 pages, Oct. 1990.

Koufopavlou et al., IEEE Global Telecommunications Conference, Globecom '92, presentation entitled, "Parallel TCP for High Performance Communication Subsystems", 7 pages, Dec. 6-9, 1992.

Lilienkamp et al., Publication entitled "Proposed Host-Front End Protocol", 56 pages, Dec. 1984.

Internet pages entitled "Hardware Assisted Protocol Processing", (which Eugene Feinber is working on), 1 page, printed Nov. 25, 1998.

Zilog product Brief entitled "Z85C30 CMOS SCC Serial Communication Controller", Zilog Inc., 3 pages, 1997.

Internet pages of Xpoint Technologies, Inc. entitled "Smart LAN Work Requests", 5 pages, printed Dec. 19, 1997.

Internet pages entitled: Asante and 100BASE-T Fast Ethernet. 7 pages, printed May 27, 1997.
Internet pages entitled: A Guide to the Paragon XP/S-A7 Supercomputer at Indiana University. 13 pages, printed Dec. 21, 1998.
Richard Stevens, "TCP/IP Illustrated, vol. 1, The Protocols", pp. 325-326 (1994).
Internet pages entitled: Northridge/Southbridge vs. Intel Hub Architecture, 4 pages, printed Feb. 19, 2001.
Gigabit Ethernet Technical Brief, Achieving End-to-End Performance. Alteon Networks, Inc., First Edition, Sep. 1996, 15 pages.
Internet pages directed to Technical Brief on Alteon Ethernet Gigabit NIC technology, www.alteon.com, 14 pages, printed Mar. 15, 1997.
VIA Technologies, Inc. article entitled "VT8501 Apollo MVP4", pp. i-iv, 1-11, cover and copyright page, revision 1.3, Feb. 1, 2000.
"Toshiba Delivers First Chips to Make Consumer Devices Internet-Ready Based On iReady's Design," Press Release Oct. 1998, 3 pages, printed Nov. 28, 1998.
Internet pages from iReady Products, web sitehttp://www.ireadyco.com/products,html, 2 pages, downloaded Nov. 25, 1998.
iReady News Archives, Toshiba, iReady shipping Internet chip, 1 page, printed Nov. 25, 1998.
Interprophet article entitled "Technology", http://www.interprophet.com/technology.html, 17 pages, printed Mar. 1, 2000.
iReady Corporation, article entitled "The I-1000 Internet Tuner", 2 pages, date unknown.
iReady article entitled "About Us Introduction", Internet pages fromhttp://www.iReadyco.com/about.html, 3 pages, printed Nov. 25, 1998.
"Comparison of Novell Netware and TCP/IP Protocol Architectures", by J.S. Carbone, 19 pages, printed Apr. 10, 1998.
Adaptec article entitled "AEA-7110C-a DuraSAN product", 11 pages, printed Oct. 1, 2001.
iSCSI HBA article entitled "iSCSI and 2Gigabit fibre Channel Host Bus Adapters from Emulex, QLogic, Adaptec, JNI", 8 pages, printed Oct. 1, 2001.
iSCSI HBA article entitled "FCE-3210/6410 32 and 64-bit PCI-to-Fibre Channel HBA", 6 pages, printed Oct. 1, 2001.
ISCSI.com article entitled "iSCSI Storage", 2 pages, printed Oct. 1, 2001.
"Two-Way TCP Traffic Over Rate Controlled Channels: Effects and Analysis", by Kalampoukas et al., IEEE Transactions on Networking, vol. 6, No. 6, Dec. 1998, 17 pages.
Internet pages of InterProphet entitled "Frequently Asked Questions", by Lynne Jolitz, printed Jun. 14, 2000, 4 pages.
"File System Design For An NFS File Server Appliance", Article by D. Hitz, et al., 13 pages.
Adaptec Press Release article entitled "Adaptec Announces EtherStorage Technology", 2 pages, May 4, 2000, printed Jun. 14, 2000.
Adaptec article entitled "EtherStorage Frequently Asked Questions", 5 pages, printed Jul. 19, 2000.
Adaptec article entitled "EtherStorage White Paper", 7 pages, printed Jul. 19, 2000.
CIBC World Markets article entitled "Computers; Storage", by J. Berlino et al., 9 pages, dated Aug. 7, 2000.
Merrill Lynch article entitled "Storage Futures", by S. Milunovich, 22 pages, dated May 10, 2000.
CBS Market Watch article entitled "Montreal Start-Up Battles Data Storage Botttleneck", by S. Taylor, dated Mar. 5, 2000, 2 pages, printed Mar. 7, 2000.
Internet-draft article entitled "SCSI/TCP (SCSI over TCP)", by J. Satran et al., 38 pages, dated Feb. 2000, printed May 19, 2000.
Internet pages entitled Technical White Paper-Xpoint's Disk to LAN Acceleration Solution for Windows NT Server, printed Jun. 5, 1997, 15 pages.
Jato Technologies article entitled Network Accelerator Chip Architecture, twelve-slide presentation, printed Aug. 19, 1998, 13 pages.
EETimes article entitled Enterprise System Uses Flexible Spec, dated Aug. 10, 1998, printed Nov. 25, 1998, 3 pages.
Internet pages entitled "Smart Ethernet Network Interface Cards", which Berend Ozceri is developing, printed Nov. 25, 1998, 2 pages.
Internet pages of Xaqti corporation entitled "GigaPower Protocol Processor Product Review," printed Nov. 25, 1999, 4 pages.
Internet pages entitled "DART: Fast Application Level Networking via Data-Copy Avoidance," by Robert J. Walsh, printed Jun. 3, 1999, 25 pages.
iReady News Archive article entitled "Revolutionary Approach to Consumer Electronics Internet Connectivity Funded", San Jose, CA, Nov. 20, 1997. 2 pages, printed Nov. 2, 1998.
iReady News Archive article entitled "Seiko Instruments Inc. (SII) Introduces World's First Internet-Ready Intelligent LCD Modules Based on iReady Technology," Santa Clara, CA and Chiba, Japan, Oct. 26, 1998. 2 pages, printed Nov. 2, 1998.
NEWSwatch article entitled "iReady internet Tuner to Web Enable Devices", Tuesday, Nov. 5, 1996, printed Nov. 2, 1998, 2 pages.
EETimes article entitled "Tuner for Toshiba, Toshiba Taps iReady for Internet Tuner", by David Lammers, 2 pages, printed Nov. 2, 1998.
IReady News article entitled "Toshiba Delivers First Chips to Make Consumer Devices Internet-Ready Based on iReady Design", Santa Clara, CA, and Tokyo, Japan, Oct. 14, 1998, printed Nov. 2, 1998, 3 pages.
Thla, Y.H. Publication entitled "High-Speed OSI Protocol Bypass Algorithm with Window Flow Control", *Protocols for High Speed Networks*, pp. 53-68, 1993.
Thla, Y.H. Publication entitled "A Reduced Operational Protocol Engine (ROPE) for a multiple-layer bypass architecture", *Protocols for High Speed Networks*, pp. 224-239, 1995.

* cited by examiner

NETWORK INTERFACE DEVICE FOR ERROR DETECTION USING PARTIAL CRCS OF VARIABLE LENGTH MESSAGE PORTIONS

REFERENCE TO CD APPENDIX

The Compact Disc Appendix, which is a part of the present disclosure, includes two copies of a recordable Compact Disc (CD-R) containing information that is part of the disclosure of the present patent document. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

BACKGROUND

The present invention relates to error correction mechanisms and methods for data blocks that are divided into portions or parts, which may involve datagrams, segments, packets, frames or fragments. This may have particular applicability in computer and other networks, especially for devices that can communicate over a network using Transport Control Protocol (TCP) over Internet Protocol (IP). Recent advances in this area include intelligent network interface hardware and software that has been developed by Alacritech, Inc. to work with a host computer. Detailed descriptions of such advances, as well as relevant claims, can be found in U.S. Pat. Nos. 6,226,680, 6,226,680, 6,247,060, 6,334,153, 6,389,479, 6,393,487, 6,427,171, 6,427,173, 6,434,620 and 6,470,415, which are incorporated by reference herein.

A Cyclic Redundancy Check (CRC) is a known mechanism for detecting errors in data storage or transmission. A CRC is generally performed by treating a block of data as a unit having a numerical value, and then dividing that numerical value by a selected divisor to obtain a remainder that is characteristic of the block of data. The remainder may be appended to the block of data before transferring the data, for example over a network or bus, so that upon receipt of the data another CRC can be performed on the received data, which is compared with the received remainder to assure data integrity. Somewhat confusingly, the remainder that results from dividing the block of data by the divisor is often itself called a CRC.

CRC calculations are commonly performed with a shift register that is coupled to logic gates to perform division of blocks of data. The data may be represented as a polynomial with each data bit serving as a coefficient of the polynomial, while another polynomial may serve as the divisor for the CRC calculation. A polynomial is a value expressed in a particular algebraic form, such as: $AX^n+BX^{n-1}+\ldots+CX^1+DX^0$, where successive powers of X are the orders and the multipliers A, B, C and D are the coefficients. Our common number system is an implied polynomial of base 10. That is, each digit of a number is multiplied by its associated power of 10 and added to each other digit multiplied by its associated power of 10 to derive a value for the number. The base 2 or binary system of numeration is also a form of the general polynomial concept.

Arithmetic modulo m is arithmetic in which at every stage of a calculation we remove all possible multiples of m, and consider only the remainders. For instance if we were to add 5 and 7, modulo 9, we would first compute 5+7=12, but then remove 9, to result in 3.

The polynomials used in conventional CRC calculations can be manipulated with polynomial modulo two arithmetic, which allows a relatively fast and direct hardware implementation of division for error detection. Modulo 2 operations are performed logically, in which the addition operation is a logical exclusive-OR (XOR) of the values, and modulo two subtraction is exactly the same XOR operation. Thus it is conventional for CRC calculations to divide a block of data, which can be viewed as a polynomial having a numerical value, by feeding the data into a shift register that is coupled to XOR gates corresponding to the polynomial divisor.

Often a block of data is separated into portions that are packaged as segments, datagrams, packets, or frames for transmission from one device to another. For example, Ethernet Protocol specifies a maximum segment size (MSS) of 1518 bytes, which may be implemented by protocols such as TCP (Transport Control Protocol) and IP (Internet Protocol) that separate data blocks into approximately 1.4 KB packets for transmission as Ethernet frames. Each frame contains a CRC, which may be called a frame check sequence (FCS) for detecting errors in that frame.

Asynchronous Transfer Mode (ATM) protocol specifies performing a CRC calculation on a message that is transmitted over a network as segments that are then reassembled, after which the CRC is checked. To do this a CRC calculation is first performed on the message and appended to it, and the message is separated into segments having exactly 48 bytes of data and 5 byte headers that are required to be transmitted and received in order. The segments are then received and the data concatenated to form the message, and then a second CRC calculation is performed on the received message and checked against the appended CRC. The unvarying size of ATM segments and the guarantee that ATM segments are received in order can be used to facilitate calculation of the CRC on the message composed of the segments.

Unlike ATM, Ethernet frames containing TCP or UDP (User Datagram Protocol) data may arrive in a different order from that with which they were sent. Moreover, a particular network may specify a MSS that differs from 1518B, and a last frame of a message will likely be less than the MSS. Further, TCP, IP and UDP header lengths may vary depending upon a number of variables (e.g., IP4 vs. IP6, TCP options, optional timestamps, etc.), and a device must be prepared to receive the frames containing those variable length headers in any order. Thus a block of data that is divided into portions prepended with TCP/IP headers or UDP/IP headers may have variable portion lengths and frames that are received out of order.

Internet SCSI (iSCSI) is an evolving network storage protocol that may require that a CRC be performed on blocks of data that are communicated over networks via TCP/IP packets. For transmission of iSCSI data between devices, a CRC remainder may be appended to a block of data that is then divided by TCP into multiple packets each having a TCP/IP header for transmission over a network, with only one of the packets having an iSCSI header. In this case, the indefinite packet length and order of the packets as received can make calculating a CRC on received data problematic. For example, temporary storage may need to be allocated to buffer all the received packets for a message so that iSCSI data from the packets can reordered and CRC tested. Particularly for the situation in which multiple iSCSI connections are handled by a network port and plural network ports are employed by a single host, providing sufficient memory resources to handle CRC calculations may be expensive.

SUMMARY

In accordance with the present invention, a device and method are disclosed for calculating a CRC on a message or block of data that has been divided into portions, by calculating a partial CRC corresponding to each of the portions and then combining the partial CRCs. The device and method are operable for portions that may have different lengths, and which may be received out of order.

DETAILED DESCRIPTION OF THE PREFERRED EMBODIMENTS

DETAILED DESCRIPTION OF THE PREFERRED EMBODIMENTS

Figure 1:
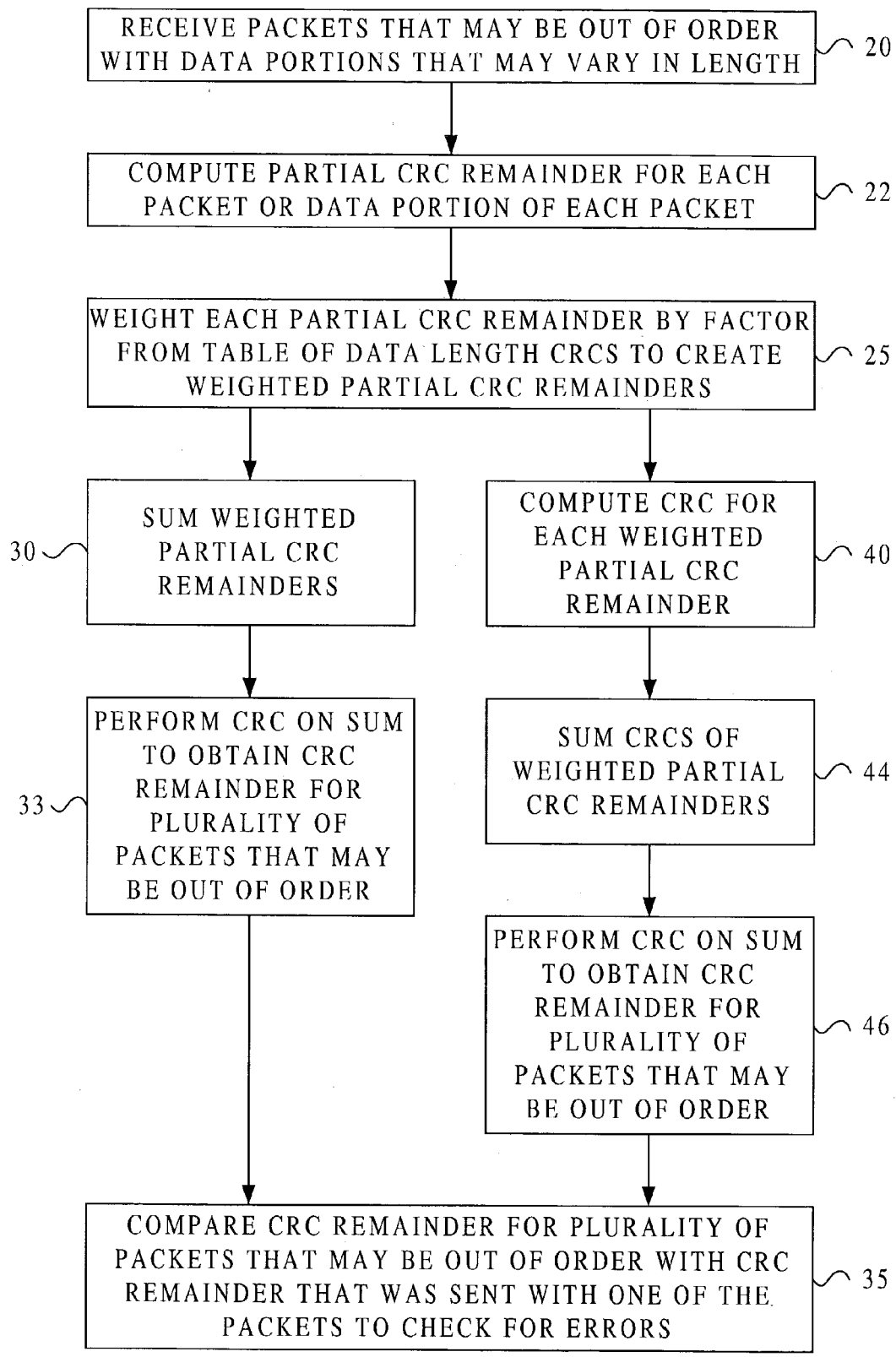
FIG. 1 is a schematic diagram of a method that can be employed by a first device for detecting errors in data received from a second device over a transmission medium such as a network, bus or wireless channel.

FIG. 1 shows a method that can be employed by a first device for detecting errors in data received from a second device over a transmission medium such as a network, bus or wireless channel. First, as shown in step 20, the first device receives a plurality of data portions in a first sequence that, when arranged in a second sequence, form a message. For example, a plurality of TCP/IP packets each containing a data portion may have been formed by the second device from a file block with an attached iSCSI header and CRC remainder, the packets transmitted over the medium and received by the first device. The CRC remainder may have been formed by dividing the file block by a polynomial divisor, and then appending the resulting remainder to the file block before it is split into the data portions.

The message may be received in order or out of order, that is, the first sequence may be the same or different from the second sequence. The message can take the form of a communication between network nodes, such as network peers or a server and a client, between a computer and a peripheral device, such as a disk or tape drive, between similar or dissimilar devices, such as a camera and a video recorder, or between different units of a printed circuit board or integrated circuit, for example. Such a message may or may not include control information such as headers accompanying the data portions. TCP and ISCSI headers may be appended to at least one of the data portions, the TCP and iSCSI headers including their respective CRC remainders, which are typically not difficult to process since these headers and their remainders are not split into separate portions.

Second, as shown in step 22, the first device computes a CRC on at least a selected portion of each of the packets. These CRCs can be calculated by dividing a numerical value corresponding to each selected portion by the divisor to determine individual remainders corresponding to each of the packets. The selected portion of a packet may be the data portion of the packet, the data portion being a part of the file stream message or block of data on which a CRC was computed by the second device before the message or block of data was segmented into packets for network transmission. In the iSCSI example, the individual CRC calculations are performed on file block portions of each packet, but not on the TCP/IP and ISCSI headers or file block CRC remainder. The individual remainders corresponding to each of the packets or portions may be termed partial CRC remainders of the packets or portion CRC remainders.

Third, as shown in step 25, each of the partial CRC remainders can be weighted by a factor derived from a position of its corresponding data portion relative to that of subsequent data portions in the second sequence, thereby creating a weighted remainder for each data portion. The position of each data portion relative to that of the other portions may be determined for example by the TCP headers of the packets, which indicate the order of the portions, and by the length of each data portion, which may be denoted in a header or counted as the packet is received. The weighting factor for each partial CRC remainder can be calculated by dividing the cumulative length of the subsequent data portions by the divisor. The weighted partial CRC remainders can then be determined by multiplying each partial CRC remainder by its weighting factor.

Alternatively, the weighting factor from the length of the subsequent data portions may be determined by looking up in a table a predetermined CRC remainder corresponding to each possible length, the predetermined remainder listed as a weighting factor. Table 1 is an example of a table listing CRC remainders for various lengths or orders of magnitude. In the example of Table 1, the number system is decimal and the divisor is seven. Such a table can also be formulated for other number systems, such as binary (base-2) or multilevel (e.g., base-4) systems, and other divisors (e.g., polynomial).

TABLE 1

|  | Decimal Order | | |
| --- | --- | --- | --- |
|  | $10^1$ (10) | $10^2$ (100) | $10^3$ (1000) |
| Length | 1 | 2 | 3 |
| Weighting Factor | 3 | 2 | 6 |

In this example the weighted partial CRC remainders can then be determined by multiplying each partial CRC remainder by its weighting factor from the table, saving the processing that otherwise would be used to calculate the weighting factors.

Certain protocols such as Ethernet and iSCSI use thirty-two bit polynomial divisors that result in thirty-two bit polynomial CRC remainders. In one embodiment such a look-up table can provide thirty-two bit remainders for each order or length of data up to about 1500, which is the maximum segment size in bytes for iSCSI packets transmitted over Ethernet. This embodiment requires about 6 KB of memory for storing the look-up table and also involves multiplying thirty-two bit partial CRC remainders by thirty-two bit weighting factors from the table. In another embodiment such a look-up table can be expanded to include a value for each bit of a thirty-two remainder already multiplied by each possible thirty-two bit weighting factor. This embodiment requires about 192 KB of memory for storing the look-up table. Which table to use for a particular situation may depend on factors such as memory costs and processor speed and availability. Other variants of these tables can instead be provided to optimize a particular situation. Either or both of these tables may be stored in a memory such as read only memory (ROM).

Fourth, as shown in step 30, the weighted CRC remainders corresponding to each data portion are added to obtain a sum of all the weighted remainders.

Fifth, as shown in step 33, the sum is divided by the divisor to obtain an overall CRC of all the data portions.

Sixth, as shown in step 35, the overall CRC is compared to the CRC remainder that has been included in one of the packets, accompanying one of the portions. If the overall CRC matches the CRC that was included in one of the packets, then the data portions may be assumed to be error free, whereas an error is indicated when the CRCs do not match.

Instead of the fourth and fifth steps just described, a CRC can be calculated for each of the weighted CRC remainders, as shown in step 40, by dividing each weighted remainder by the divisor. The weighted remainder CRCs can then be added to create a sum of the weighted remainder CRCs, as shown in step 44. A CRC of the sum of the weighted remainder CRCs can be calculated to obtain a CRC of all the data portions, as shown in step 46. Then, as shown in step 35, the CRC of all the data portions is compared to the CRC remainder that was included in one of the packets. If the CRC of all the data portions matches the CRC that was included in one of the packets, then the data portions may be assumed to be error free.

Appendix A is a description written in the software language C to perform the CRC weighting described above. Appendix B provides a similar description written in Verilog code for computer hardware to perform the CRC weighting.

Figure 2:
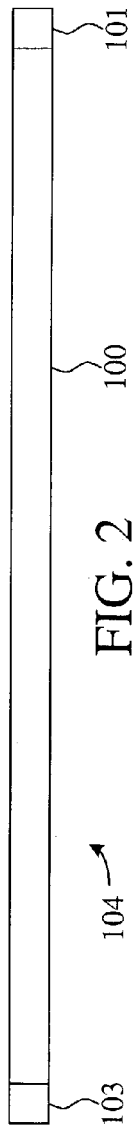
FIG. 2 is a schematic diagram of a file stream or block of data that has been appended with a header and CRC remainder to form a message.

FIG. 2 shows an example of a file stream or block 100 of data that has been appended with a header 103 and CRC remainder 101 to form a message 104. The CRC remainder 101 may be called a data digest. As described above, the data 100 may have been requested by the first device to be read from a second device that is connected to the first device by a network, bus or wireless channel. Either or both of the devices may be computers, routers, servers, network adapters, host bus adapters, set top boxes, game machines, personal digital assistants, wireless phones or the like, and the network, bus or wireless channel may for example operate in accordance with a known protocol such as Gigabit Ethernet. The read request may involve more than one block of data and may for example be a request for a file or a portion thereof that is stored on the second device or a storage unit of the second device.

The second device has prepended a header 103 such as an iSCSI header to the block 100, and performed a CRC calculation on the block 100, appending a CRC remainder 101 derived from the CRC calculation to the block. A separate CRC calculation may be performed on the header 103, with another CRC remainder, not shown, appended to the header 103. The block of data 100 may be considered to be at an application level, whereas the combined block of data 100, header 103 and remainder 101 may be considered to be at a session level and denoted here as session layer block 104 or iSCSI message 104. Although an iSCSI CRC remainder 101 is shown in this example, other protocols, such as session level file transfer protocols like server message block (SMB) or file transfer protocol (FTP), may also employ CRC remainders.

Figure 3:
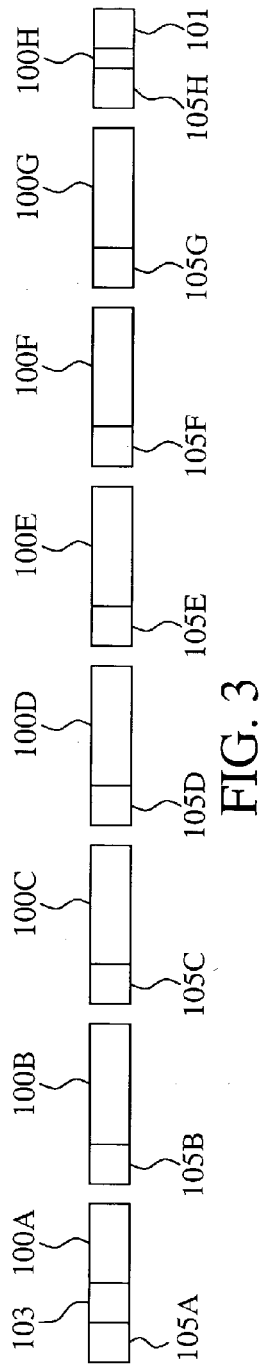
FIG. 3 is a schematic diagram of segmentation of the message of FIG. 2 into packets for transmission over the network.

FIG. 3 shows that for transmission over the network, the second device splits the session block 104 into data portions 100A–100H, which are prepended with headers 105A–105H to form packets that may for example include TCP, IP, and MAC protocols. For transmission over Ethernet networks of various data speeds, most of the data portions 100A–100H contain approximately 1.4 KB of the application data 100, although an initial or first portion 100A has less data to accommodate header 103. A final or last portion 100H also has less application data 100 than portions 100A–100G to accommodate the CRC remainder 101, and because the block 104 does not divide conveniently into uniform portions. The last portion 100H may be padded with zeros to the next 4-byte boundary before appending the CRC remainder 101. Such a final portion may also include iSCSI response data.

Figure 4:
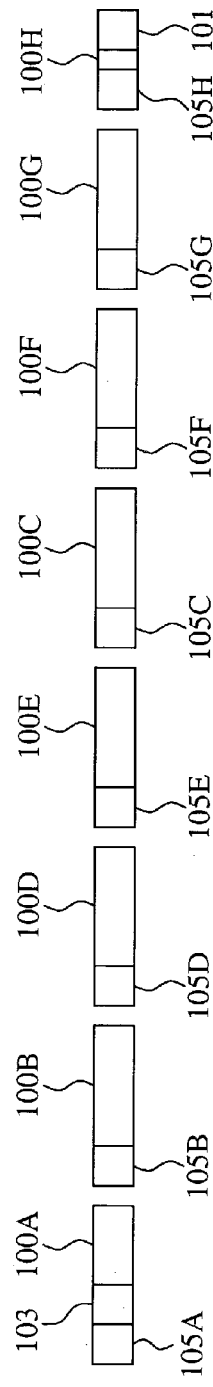
FIG. 4 is a schematic diagram of the packets of FIG. 3 as received from the network in a different order than that in which they were sent.

FIG. 4 shows the packets, including data portions 100A–100H and headers 105A–105I, as received by the first device after transmission over the network from the second device. Note that in this example the packets have been received in a different order than that in which they were sent. Also, although not shown in this figure, packets containing block 100 may be received by the first device intermixed with unrelated packets containing other network messages. Such out of order and intermixed received packets may be prevalent for many network and device configurations.

Figure 5:
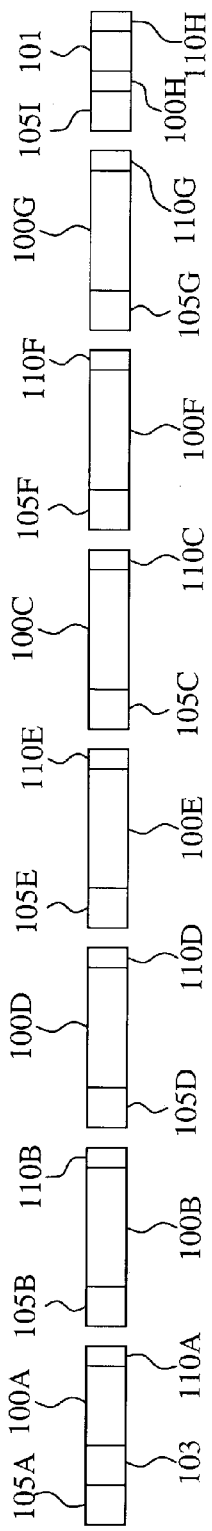
FIG. 5 is a schematic diagram of the packets of FIG. 3 after a CRC has been performed on each of the data portions of the packets and a partial CRC remainder appended to each corresponding data portion.

In FIG. 5, a CRC has been performed on each of the data portions 105A–105H, with a partial CRC remainder 110A–110H appended to each corresponding data portion.

Figure 6:
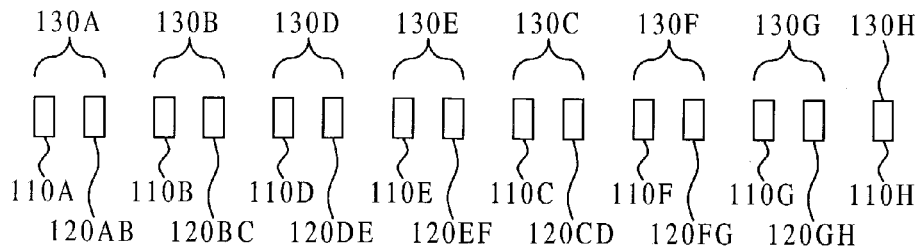
FIG. 6 is a schematic diagram of the partial CRC remainders of FIG. 3 along with a weighting factor for each partial CRC remainder.

Alternatively, as shown in FIG. 6, partial CRC remainders 110A–110H may not be appended to each corresponding data portion CRC remainder, but separately stored, e.g., in a separate register. FIG. 6 also shows weighting factors 120AB–120GH that are grouped with partial CRC remainders 110A–110H to create weighted partial CRC remainders 130A–130H. As mentioned above, weightings 120AB–120GH may be determined by calculating a CRC on the length of a consecutive data portion of partial CRC remainders 110A–110H. To expedite processing, a table listing a CRC for each possible data portion length may be referenced for determining weightings 120AB–120GH. Partial CRC remainder 110H is identical to weighted partial CRC remainder 130H in this example because there is no data portion consecutive to data portion 100H, and the length of that data portion and the CRC of that length are both zero. Also as mentioned above, weighted partial CRC remainders 130A–130H can be added together to create a sum of the weighted partial CRC remainders. A CRC calculation is then performed on that sum, and the resulting remainder compared with remainder 101 to check for errors.

Note that the above-described process that includes weighting partial CRCs of different data portions of a message may be performed whether or not the portions are received in the same order as that in which they were sent. For the situation in which the data portions are received in the same order as that in which they were sent, it is convenient to seed each data portion with the partial CRC remainder of the previous data portion, without weighting the partial CRC remainders. Most of the packets sent over a reliable network protocol such as TCP are received in the correct order, in which case a CRC can be calculated on the received packets by seeding each consecutive data portion of a message with the partial CRC remainder of the previous data portion from that message.

Those packets that are received out of order can be identified and instead processed by weighting the partial CRCs. Seeding each consecutive data portion of a message with the partial CRC of the previous data portion from that message may be quicker than the weighted partial CRC approach, with the seeding approach termed fast-path partial CRC processing and the weighting approach termed slow-path partial CRC processing. Those CRC processing approaches may be part of systems such as those described below that provide fast-path processing of most data intensive communications with slow-path processing of more variable items such as errors and connection set-up.

Figure 7:
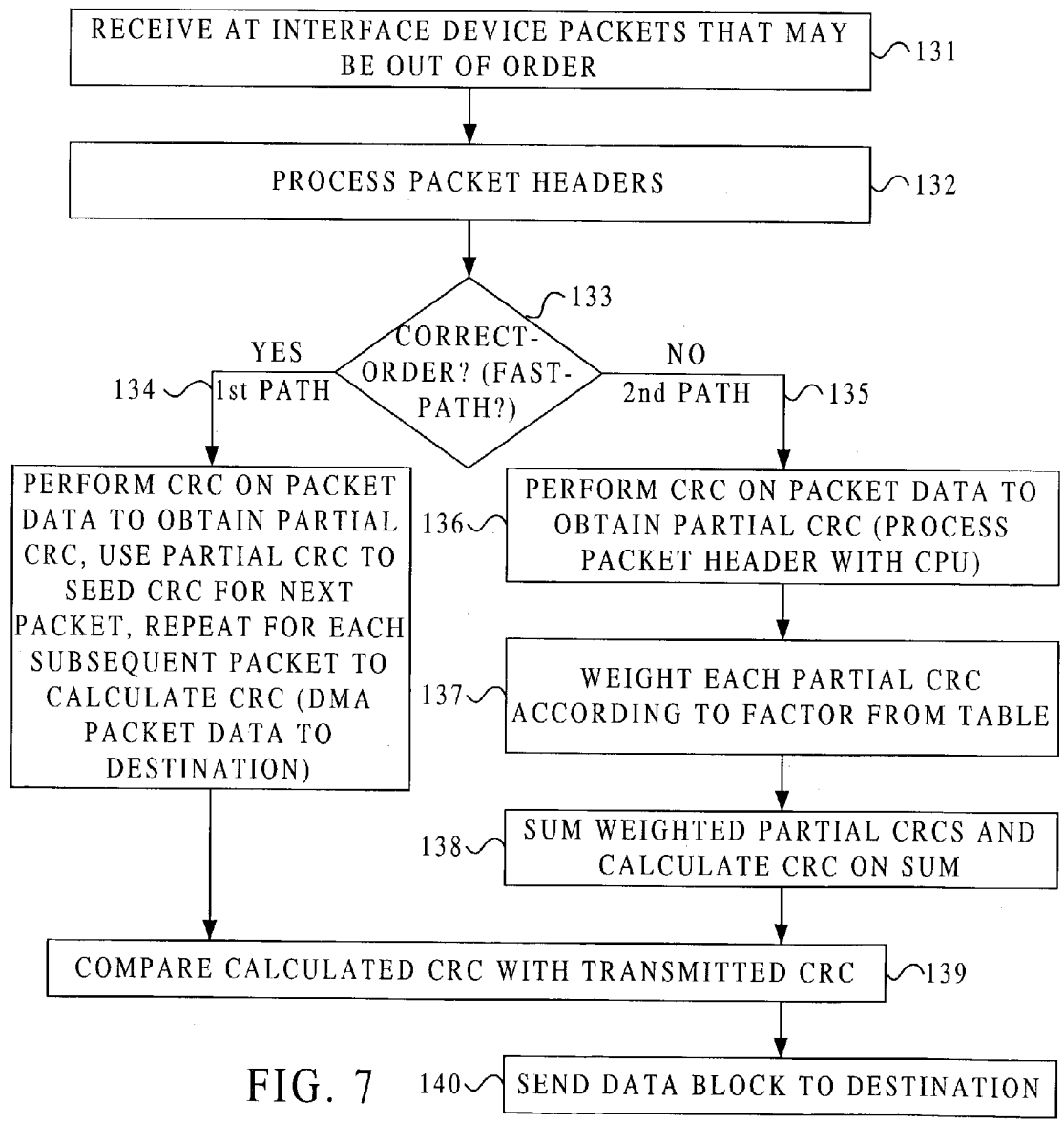
FIG. 7 is a schematic diagram of a method for detecting errors in a message that has been received as plural portions or packets, with the message accompanied by a message CRC that may be contained in one of the packets.

FIG. 7 illustrates a method for detecting errors in a message that has been received as plural portions or packets, with the message accompanied by a message CRC that may be contained in one of the packets. The method involves processing received packets that can include both a first path that processes partial CRCs by seeding with prior partial CRCs and a second path that processes partial CRCs by weighting partial CRCs. In a first step, a plurality of packets is received 131 by an interface device from a transmission medium such as a network, bus or wireless channel. The packets may be received in the same order or a different order as that in which they were sent, and may in either case be interspersed with packets corresponding to different messages, such as those sent from different computers or communication devices. Also interspersed with the received packets may be packets or other signals that are not bound for the interface device, as determined, for example, by MAC layer processing.

Each received packet includes control information such as a header corresponding to plural protocol layers, and that control information is initially processed 132 by the interface device. This processing may be termed protocol processing, and may be performed by interface device hardware that is dedicated to processing network and/or storage protocols. Results from processing the control information can be used to determine whether the packet has been received in the same order as that in which it was sent, which may be termed a correct order, or received in a different order, which may be termed an incorrect order or out of order. For example a TCP header portion of each packet may include a sequence number that indicates the order of packets in a message or session.

A processor or other mechanism may determine 133, based on the protocol processing, whether the session CRC is to be processed by a first path 134, which may also include fast-path data handling features, or by a second path 135 that may involve slow-path data handling features. Packets that are part of a message that is in the correct order can then have a CRC calculation performed in accordance the first path 134, which involves seeding each packet's CRC with a CRC from the previous packet. Packets that are part of a message that is out of order can instead have a CRC calculation performed in accordance with the second path 135, which involves weighting each packet's CRC by a factor from a table or CRC from length of subsequent segments, such as described above with reference to FIG. 1. Similarly, results from processing the control information can be used to determine 133 whether the packet is categorized as a fast-path packet or a slow-path packet.

A fast-path received packet in this example is a packet that corresponds to an established connection that can be controlled or accessed by the interface device, for example a TCP/IP connection, and which has been received by the interface device in the same order as that in which it was sent. Data from a fast-path packet can be moved to its destination with fewer processing steps that need to be performed by a processor, which may have advantages such as reduced interrupts, copying and processor utilization, often eliminating a bottleneck. In this fast-path case the packet data can be moved by a DMA unit to a destination defined by the connection, with the DMA unit calculating a partial CRC on the packet data and using that partial CRC to seed a CRC calculation for a subsequent packet. As noted above, the technique of seeding a packet data CRC calculation with a partial CRC from a previous packet can be used as long as the packets are arranged in the same order as that in which they were sent, whether or not a fast-path is employed for data handling.

For the situation in which it is determined 133 that a packet is not in the correct order, that packet may be processed in accordance with the second path 135, which may also involve slow-path processing of the packet headers. In this example of the second path 135 a CRC is performed 136 on the packet data to obtain a partial CRC for that packet. The packet header including control information corresponding to plural protocol layers may be processed by a processor at this time or previously, in accordance with a slow-path for protocol processing. Each partial CRC can then be weighted 137 according to a table as described above, to obtain a weighted partial CRC for that packet. The weighted partial CRCs from the message can then be summed, and a CRC performed on that sum 138 to obtain a CRC for the message.

In both the fast-path 134 and slow-path 135, the calculated CRC may be compared 140 with the CRC that was transmitted with the message, and the data from the message may be sent to its destination, e.g., a memory location in a file cache. Should the calculated CRC not match the CRC that was transmitted with the message, an error signal may be generated and retransmittal of the message or data requested. For a fast-path 134 example in which the data from one or more packets may be sent to its destination prior to the CRC comparison being completed, a mechanism such as a DMA unit may retrieve that data from the destination.

Figure 8:
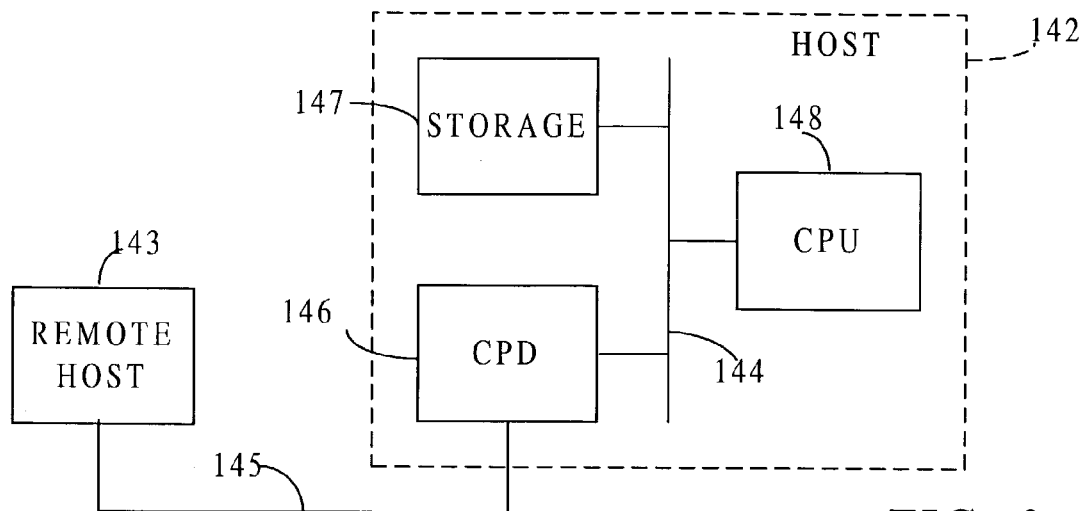
FIG. 8 is a schematic diagram of a first device such as a host connected by a network interface device to a remote host.

FIG. 8 shows a first device such as a host 142 connected by a network 145 to a second device such as a remote host 143. The host 142 in a first embodiment contains a processor such as central processing unit (CPU) 148 and protocol processing hardware such as communication processing device (CPD) 146 connected by a host bus 144. The CPD 146 may include a microprocessor, logic gates and/or sequencers dedicated to processing network or storage communications and memory buffers for temporary storage of such communications. Also connected to the host bus 144 is a storage device 147, such as a semiconductor memory or disk drive, along with any related controls. One or more direct memory access (DMA) units may be contained in the CPD that can access storage device 147.

Figure 9:
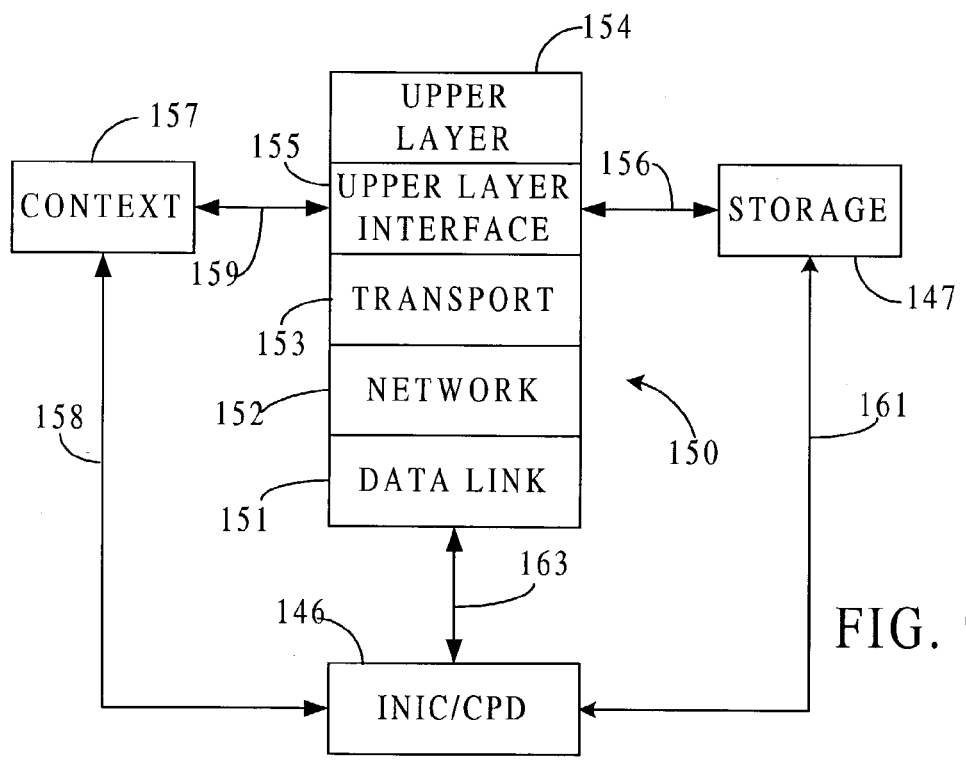
FIG. 9 is a schematic diagram of a protocol processing stack that processes network messages according to a slow-path and a fast-path that avoids the protocol processing stack to process network messages.

Referring additionally to FIG. 9, the host CPU 148 runs a protocol processing stack 150 housed in storage 147, the stack including a data link layer 151, network layer 152, transport layer 153, upper layer 154 and an upper layer interface 155. The upper layer 154 may represent a session, presentation and/or application layer, depending upon the particular protocol being employed and message communicated. The upper layer interface 155, along with the CPU 148 and any related controls can send or retrieve a file to or from the upper layer 154 or storage 147, as shown by arrow 156. A connection context 157 has been created, as will be explained below, the context summarizing various features of the connection, such as protocol type and source and destination addresses for each protocol layer. The context may be passed between an interface 155 for the session layer and the CPD 146, as shown by arrows 158 and 159, and stored as a communication control block (CCB) or transmission control block (TCB) at either CPD 146 or storage 147.

When the CPD 146 controls a CCB defining a particular connection, data received by the CPD from the network and pertaining to the connection is referenced to that CCB and can then be sent directly to storage 147 according to a fast-path 161, bypassing sequential protocol processing by the data link 151, network 152 and transport 153 layers. Transmitting a message, such as sending a file from storage 147 to remote host 143, can also occur via the fast-path 161, in which case the context for the file data is added by the CPD 146 referencing a CCB, rather than by sequentially adding headers during processing by the transport 153, network 152 and data link 151 layers. DMA controllers of the CPD 146 can perform these transfers between CPD and storage 147, and can also perform CRC calculations.

The CPD 146 collapses multiple protocol stacks each having possible separate states into a single state machine for fast-path processing. As a result, exception conditions may occur that are not provided for in the single state machine, primarily because such conditions occur infrequently and to deal with them on the CPD would provide little or no performance benefit to the host. Such exceptions can be CPD 146 or CPU 148 initiated. One type of exception condition that may trigger slow-path processing is a packet that has been received out of order. Slow-path processing can include weighting of partial CRCs, whereas fast-path processing can include seeding of partial CRCs.

Advantages of this system include the manner in which unexpected situations that occur on a fast-path CCB are handled. The CPD 146 deals with these rare situations by passing back control of or flushing to the host protocol stack 150 the CCB and any associated message frames involved, via a control negotiation. The exception condition is then processed in a conventional manner by the host protocol stack 150. At some later time, usually directly after the handling of the exception condition has completed and fast-path processing can resume, the host stack 150 hands control of the CCB back to the CPD.

This fallback capability enables the performance-impacting functions of the host protocols to be handled by the CPD network microprocessor, while the exceptions are dealt with by the host stacks, the exceptions being so rare as to negligibly effect overall performance. The custom designed network microprocessor can have independent processors for transmitting and receiving network information, and further processors for assisting and queuing. Microprocessor embodiments can include pipelined receive and transmit processors. DMA controllers may be integrated into the implementation and work in close concert with the network microprocessor to quickly move data between buffers accessed by the controllers and other locations such as long term storage. Such DMA controllers can also include registers that calculate partial CRCs of received data portions. Alternatively, a CRC calculation register can be coupled to a receive sequencer independently from any DMA controllers, for performing CRC calculations on received packet data after other hardware has processed network and transport layer headers. A similar CRC calculation register can be coupled to a transmit sequencer independently from any DMA controllers, for performing CRC calculations on transmit data blocks before other mechanisms have processed network and transport layer headers.

Instead of the above-described embodiment of a CPD that is integrated with a processor such as a CPU running a protocol processing stack, another embodiment has an intelligent network interface card (INIC) that is coupled to a CPU across an input/output (I/O) bus such as a PCI bus. A more detailed description of such an INIC is provided below with reference to FIG. 14.

Figure 10:
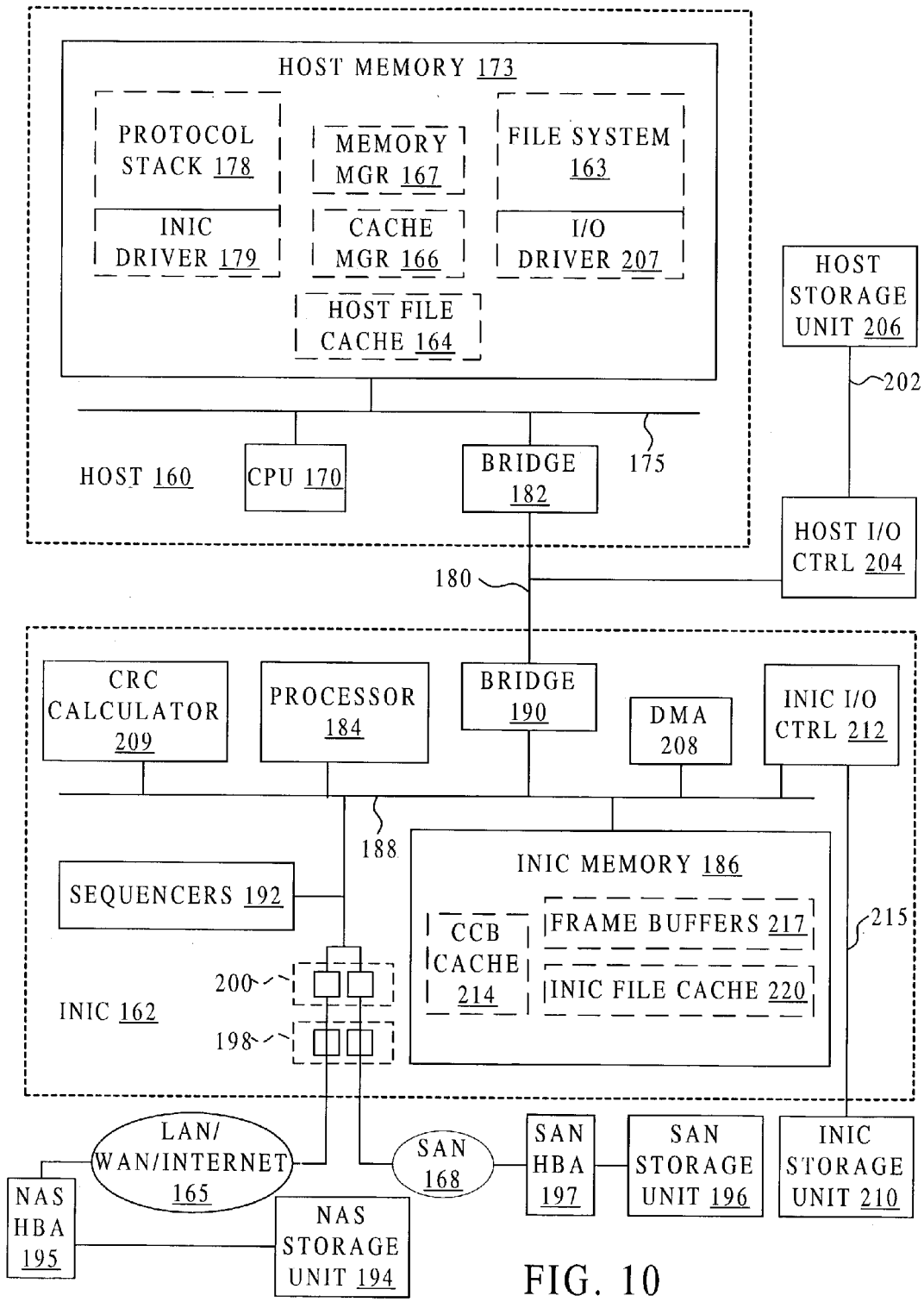
FIG. 10 is a schematic diagram of an integrated storage network interface card (IS-NIC) that can simultaneously accelerate both IP storage and standard Ethernet traffic.

Such an INIC that can simultaneously accelerate both IP storage and standard Ethernet traffic may be termed an integrated storage network interface card (IS-NIC). An overview of an IS-NIC is shown in FIG. 10. Similar to that described above, a host computer 160 is connected to an interface device such as intelligent network interface card (INIC) 162 that may have one or more ports for connection to various networks. In this embodiment, INIC 162 is coupled to a local area network (LAN), wide area network (WAN) and/or the Internet 165, as well as to storage area network (SAN) 168. Although this example shows two network physical connections, which may be termed network ports, more or less network ports can be provided, and each port may maintain plural logical connections to LANs, WANs, SANs, and the Internet. A network attached storage (NAS) unit 194 is coupled to LAN/WAN/Internet 165 by NAS host bus adapter (HBA) 195. A SAN storage unit 196, such as a disk drive or collection of disk drives and corresponding controller, is coupled to SAN 168 by SAN HBA 197.

INIC 162 can read and write blocks of data on NAS storage unit 194 over LAN/WAN/Internet 165 using a specialized protocol that allows storage commands to be sent along with data over IP networks. One such storage protocol is described by J. Satran et al. in the Internet-Draft of the Internet Engineering Task Force (IETF) entitled "iSCSI (Internet SCSI), Document: draft-ietf-ips-iSCSI-10.txt" dated Jan. 20, 2002, which is incorporated by reference herein. Similarly, INIC 162 can read and write blocks of data on SAN storage unit 196 using iSCSI/TCP/IP protocols. Any or all of the networks 25 and 28 may operate in accordance with Ethernet, Fast Ethernet or Gigabit Ethernet standards. Gigabit Ethernet, examples of which are described by 802.3z and 802.3ab standards, may provide data transfer rates of 1 gigabit/second or 10 gigabits/second, or possibly greater rates in the future.

The host 160 contains a processor such as central processing unit (CPU) 170 connected to a host memory 173 by a host bus 175, with an operating system, not shown, residing in memory 173, for overseeing various tasks and devices, including a file system 163. Also stored in host memory 173 is a protocol stack 178 of instructions for processing of network communications and an INIC driver 179 for communication between the INIC 162 and the protocol stack 178. A cache manager 166 runs under the control of the file system 163 and an optional memory manager 167, such as the virtual memory manager of Windows® NT or 2000, to store and retrieve file portions, termed file streams or data blocks, on a host file cache 164.

The host 160 is connected to the INIC 162 by an I/O bus 180, such as a PCI or Infiniband bus, which is coupled to the host bus 175 by a host I/O bridge 182. The INIC includes an interface processor 184 and memory 186 that are interconnected by an INIC bus 188. INIC bus 188 is coupled to the I/O bus 180 with an INIC I/O bridge 190. Also connected to INIC bus 188 are processors or hardware sequencers 192 that provide upper layer processing of network messages. Physical connection to LAN/WAN/Internet 165 and SAN 168 is provided by conventional physical layer hardware PHY 198. Each of the PHY 198 units is connected to a corresponding unit of media access control (MAC) 200, the MAC units each providing a conventional data link layer connection between the INIC and one of the networks. A DMA unit 208 can access host memory 173 and INIC memory 186, for example to write data from a received packet from frame buffers 217 to a destination in host file cache 164. DMA unit 208 may contain a register that is set to calculate CRCs, or such a CRC calculator 209 may be separately disposed in INIC 162.

Each packet accepted by MAC units 200 is checked for errors and categorized by processors or hardware sequencers 202, and placed in frame buffers 217 along with status information summarizing the results of that processing. Processor 214 then determines, based on that status, whether the packet is classified as fast-path or slow-path. In general, fast-path packets are received in order, without errors and correspond to a TCP connection controlled by INIC 162, so that the data from fast-path packets can be sent directly to a destination indicated by the TCP connection with minimal processing. Slow-path packets, on the other hand, are further processed by a CPU on the host or INIC. The CRC system and method disclosed herein can be used for both fast path and slow path packets and can be used for systems that do not differentiate between a fast-path and a slow-path.

Because seeding a consecutive data portion with a partial CRC remainder can involve fewer steps than weighting and summing partial CRC remainders, this system fits well with fast-path and slow-path differentiation.

A host storage unit 206, such as a disk drive or collection of disk drives and corresponding controller, may be coupled to the I/O bus 40 by a conventional I/O controller 204, such as a SCSI adapter. A parallel data channel 202 connects controller 204 to host storage unit 206. An I/O driver 207, e.g., a SCSI driver module, operating under command of the file system 163 interacts with controller 204 to read or write data on host storage unit 206. Host storage unit 206 preferably contains the operating system code for the host 160, including the file system 163, which may be cached in host memory 173.

INIC memory 186 includes frame buffers 217 for temporary storage of packets received from or transmitted to a network such as LAN/WAN/Internet 165. INIC memory 186 also includes an interface file cache, INIC file cache 220, for temporary storage of data stored on or retrieved from INIC storage unit 210. Although INIC memory 206 is depicted in FIG. 1 as a single block for clarity, memory 186 may be formed of separate units disposed in various locations in the INIC 162, and may be composed of dynamic random access memory (DRAM), static random access memory (SRAM), read only memory (ROM) and other forms of memory. An INIC storage unit 210, such as a disk drive or collection of disk drives and corresponding controller, is coupled to INIC 162 via INIC I/O controller 212.

Figure 11:
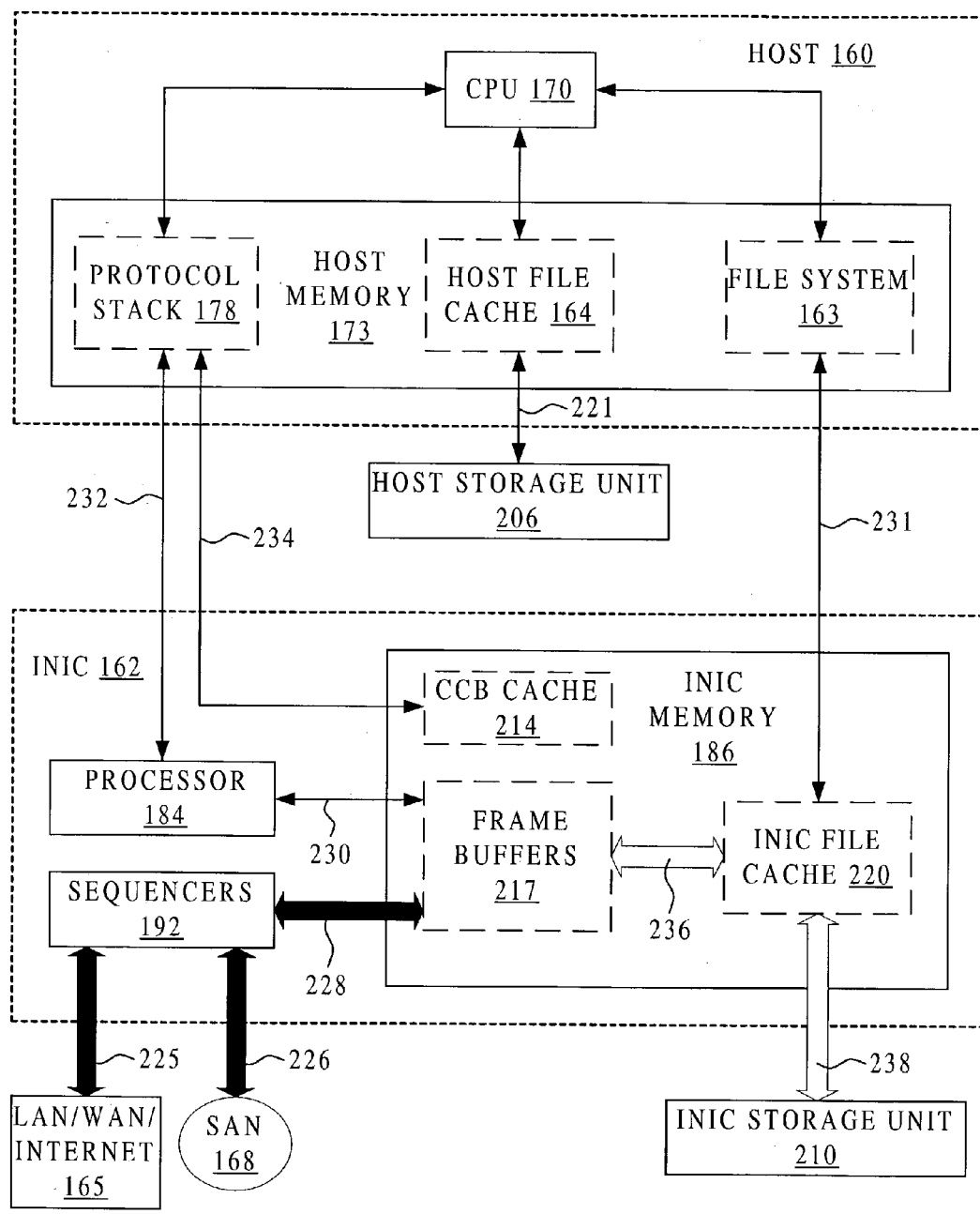
FIG. 11 is a schematic diagram of information flow paths of the embodiment of FIG. 10.

An approximation of the information flow paths of the embodiment of FIG. 10 is depicted in FIG. 11, which segregates the main paths for information flow by showing the primary type of information for each path. FIG. 11 shows information flow paths consisting primarily of control information with thin arrows, information flow paths consisting primarily of data with thick white arrows, and information flow paths consisting of both control information and data with thick black arrows. Note that host 160 is primarily involved with control information flows, while the INIC storage unit 210 is primarily involved with data transfer.

Information flow between INIC 162 and networks such as LAN/WAN/Internet 165 and SAN 168 may include control information and data, and so is shown with thick black arrows 225 and 226, respectively. Examples of information flow 225 between INIC 162 and networks such as LAN/WAN/Internet 165 and SAN 168 include control information, such as connection initialization dialogs and acknowledgements, as well as file reads or writes, which are sent as packets containing file data encapsulated in control information. The sequencers 192 process control information from file writes and pass data and control information to and from INIC frame buffers 217, and so those transfers are represented with thick black arrow 228.

Control information regarding the data stored in frame buffers 217 is operated on by the processor 184, as shown by thin arrow 230, and control information such as network connection initialization packets and session layer headers are sent to the protocol stack 178, as shown by thin arrow 232. When a connection has been set up by the host, control information regarding that connection, such as a CCB, may be passed between host protocol stack 178 and INIC memory 186, as shown by thin arrow 234.

Temporary storage of data being read from or written to INIC storage unit 210 is provided by INIC file cache 220 and frame buffers 217, as illustrated by thick white arrows 236 and 238. Control and knowledge of all file streams that are stored on INIC file cache 220 is provided by file system 163, as shown by thin arrow 231. In an embodiment for which host storage unit 206 does not store network accessible data, file system information is passed between host file cache 164 and host storage unit 206, as shown by thin arrow 221. Other embodiments, not shown in this figure, may not include a host storage unit, or alternatively may use a host storage unit and host file cache primarily for network file transfers.

It is apparent from FIG. 11 that data of network file reads or writes primarily pass through the INIC 162 and avoid the host 160, whereas control information is primarily passed between the host and INIC. This segregation of control information from data for file transfers between a network and storage allows the host to manage the file transfers that flow through the INIC between the network and storage, while the INIC provides a fast-path for those file transfers that accelerates data throughput. Increased throughput afforded by the INIC data fast-path allows host and INIC to function, for example, as a database server for high bandwidth applications such as video, in addition to functioning as a file server.

Figure 12:
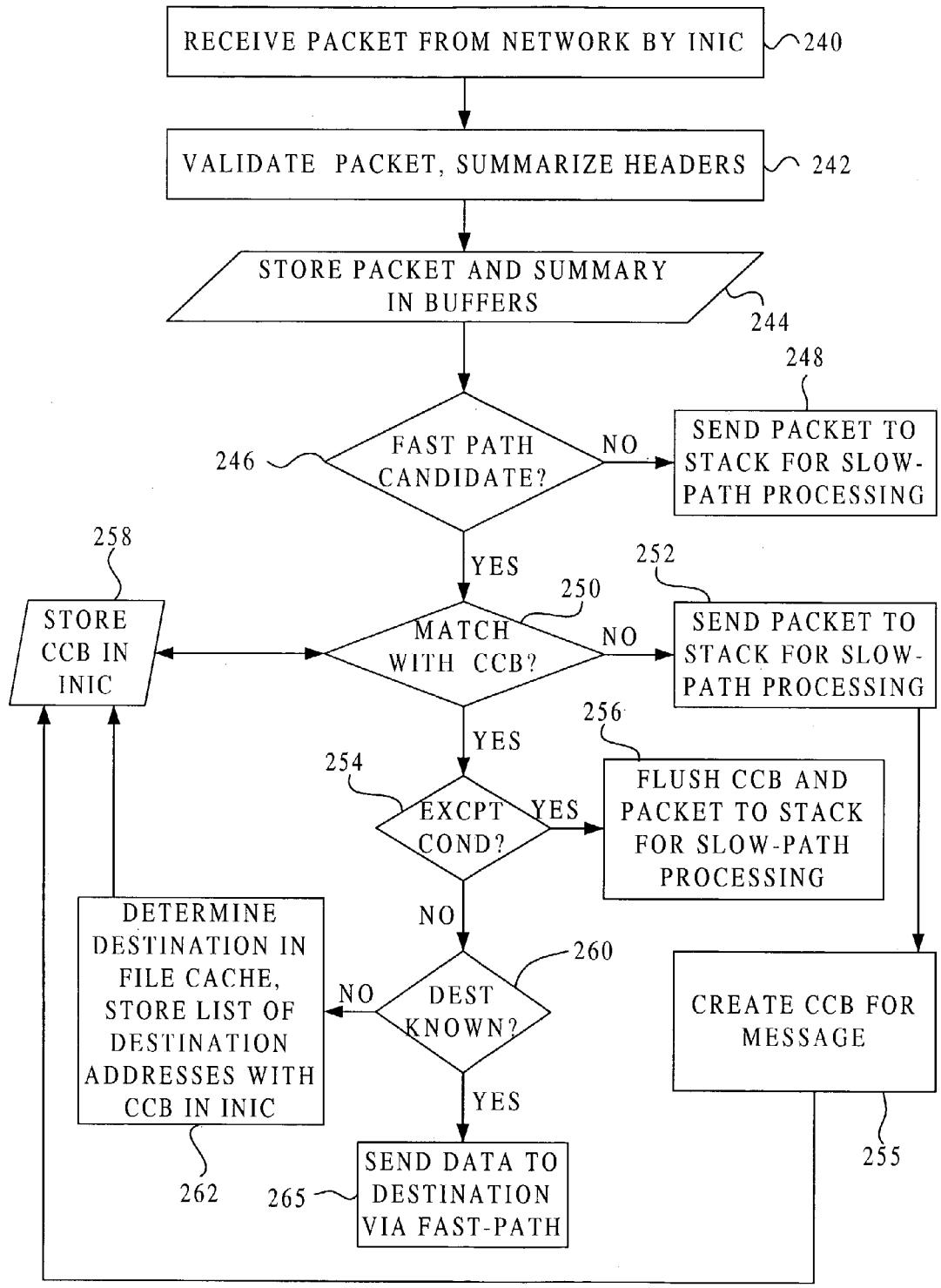
FIG. 12 is a schematic diagram of some steps performed by the system of FIG. 10 for storing messages received from a network.

FIG. 12 illustrates some steps performed by the system of FIG. 10 for storing messages received from a network. A packet sent from a network such as LAN/WAN/Internet 165 is first received 240 at the INIC 162 by the PHY unit 198, and the MAC unit 200 performs link layer processing such as verifying that the packet is addressed to host 160. The network, transport and, optionally, session layer headers of that packet are then processed 242 by the sequencers 192, which validate the packet and create a summary of those headers. The summary is then added to the packet and stored 244 in one of the frame buffers 217. The processor 184 then determines 246 whether the packet is a candidate for fast-path processing, by checking the packet summary. Whether a packet is a fast path candidate may be determined simply by the protocol of the packet, as denoted in the summary. For the case in which the packet is not a fast-path candidate, the packet is sent 248 across the I/O bus 180 to host memory 173 for processing the headers of the packet by the CPU 170 running instructions from the protocol stack 178.

For the case in which the packet is a fast-path candidate, the packet summary is then compared 250 with a set of fast-path connections being handled by the card, each connection represented as a CCB, by matching the summary with CCB hashes and the CCB cache. If the summary does not match a CCB held in the INIC memory, the packet is sent 252 to host memory for processing the headers of the packet by the CPU running instructions from the protocol stack. For the case in which the packet is part of a connection initialization dialog, the packet may be used to create 255 a CCB for the message. If the packet summary instead matches a CCB held in the INIC memory, the processor checks 254 for exception conditions which may include, e.g., fragmented or out of order packets and, if such an exception condition is found, flushes 256 the CCB and the packet to the host protocol stack 178 for protocol processing. For the case in which a packet summary matches a CCB but a destination for the packet is not indicated with the CCB, the session layer header of the packet is sent to the host protocol stack 178 to determine 262 a destination in the host file cache or INIC file cache, according to the file system, with a list of cache addresses for that destination stored with the CCB in the INIC. The INIC also checks 264 the packet summary for exception conditions that would cause the CCB to be flushed to the host 266 and the packet to be sent to the host for processing by the stack.

For the case in which a packet summary matches a CCB and a destination for the packet is stored with the CCB, and no exception conditions exist, the data from the packet is sent 265 by DMA to the destination in the host file cache or the INIC file cache designated by the CCB. The message packet in this case bypasses processing of the headers by the host protocol processing stack, providing fast-path data transfer. A partial CRC for the packet and other packets from the session layer message, e.g., an iSCSI data block, can be performed by seeding the partial CRC with the prior packet's partial CRC in CRC calculator 209. For the situation in which the data of the packets is sent via the fast-path to the INIC file cache and INIC storage, the packets not only avoid protocol processing by the host but do not cross the I/O bus or the host memory bus, providing tremendous savings of time, CPU processing and bus traffic compared to traditional network storage.

Figure 13:
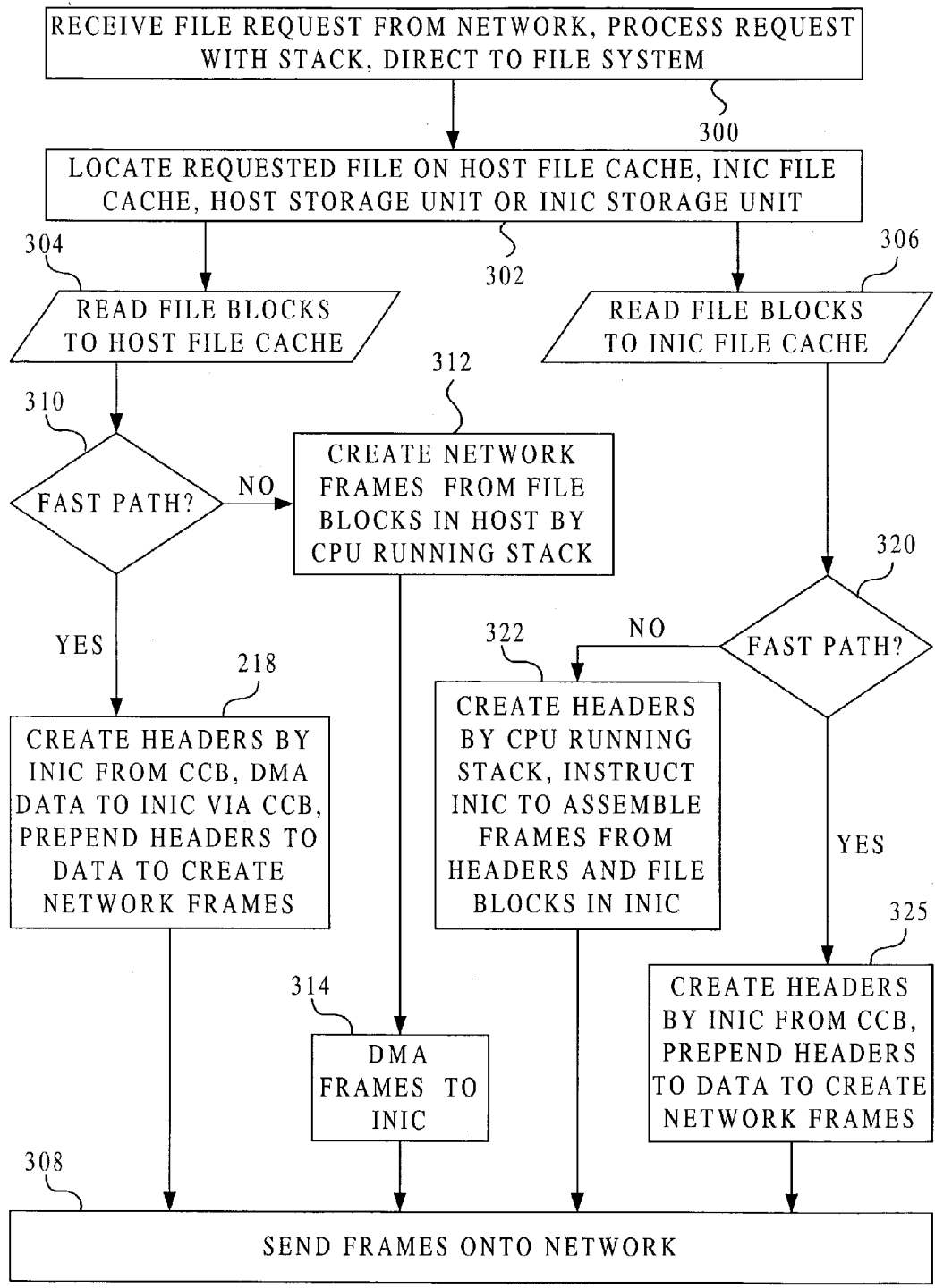
FIG. 13 is a schematic diagram of some steps performed by the system of FIG. 10 for retrieving a file or part of a file from a host storage unit or INIC storage unit in response to a request from a network.

FIG. 13 shows some steps performed by the system of FIG. 10 for retrieving a file or part of a file from host storage unit 206 or INIC storage unit 210 in response to a request 300 from a network, such as LAN/WAN/Internet 165. First, the request packet is processed by the protocol stack, which directs the request to the file system. The file system locates 302 the file indicated in the request, including determining whether the file streams corresponding to the file are cached in INIC file cache or host file cache, and if the file streams are not located in one of the caches, determining whether the block or blocks corresponding to the file are stored on the host storage unit or the INIC storage unit. Assuming the file streams are not located in one of the caches, the file blocks are then read to the host file cache 304 or read to the INIC file cache 306. For most situations, file blocks stored on the host storage unit will be read into the host file cache and file blocks stored on the INIC storage unit will be read into the INIC file cache, but this mapping is not necessary. It may be desirable, for example, to read file blocks stored on the host storage unit into the INIC file cache, thereby reducing traffic on the host memory bus.

For the case in which the file blocks are cached in the host file cache, the host determines 310 whether to send the file by fast-path processing, by noting whether a CCB corresponding to the request is being held by the INIC. If the host chooses not to use the fast-path but to send the file from the host by the slow-path, the CPU runs the protocol stack to create headers for the data held in the host file cache, and then adds the headers and checksums to the data, creating network frames 312 for transmission over the network by the INIC, as is conventional. A header for a block of data may, for example, include an iSCSI header containing a CRC. The INIC then uses DMA to acquire the frames from the host 314, and the INIC then sends the frames 308 onto the network. If instead the file is to be sent by the fast-path, the INIC processor uses the CCB to create headers and checksums and to DMA frame-sized portions of data from the host file cache, and then prepends the headers and checksums to the data portions to create network frames 318, freeing the host from protocol processing.

Similarly, if the file blocks are cached in the INIC file cache, the host determines 320 whether to send the file by fast-path processing, by noting whether a CCB is being held by the INIC. If the host chooses not to use the fast-path, the host CPU then 322 prepares headers and checksums for the file block data, storing the headers in host memory. As mentioned above, the header for a block of the data may, for example, include an iSCSI header containing a CRC. The host then instructs the INIC to assemble network frames by prepending headers from host memory to data in INIC memory, creating message frames that are then sent over the network by the INIC. Even for this non-fast-path case, the data is not moved over the I/O bus to the host and back to the INIC, reducing I/O traffic compared to a conventional transmit of file blocks located on a storage unit connected to a host by an I/O bus or network. If instead the fast-path is selected, the CRC calculator 209 or DMA unit 208 may create a CRC that is prepended to the block of data. The INIC processor then 325 creates headers and checksums corresponding to the CCB, and prepends the headers and checksums to data portions from the INIC file cache to create network frames, which are then sent 308 by the INIC over the network. In this fast-path case the host is relieved of protocol processing and host memory bus traffic as well as being relieved of I/O bus traffic.

Figure 14:
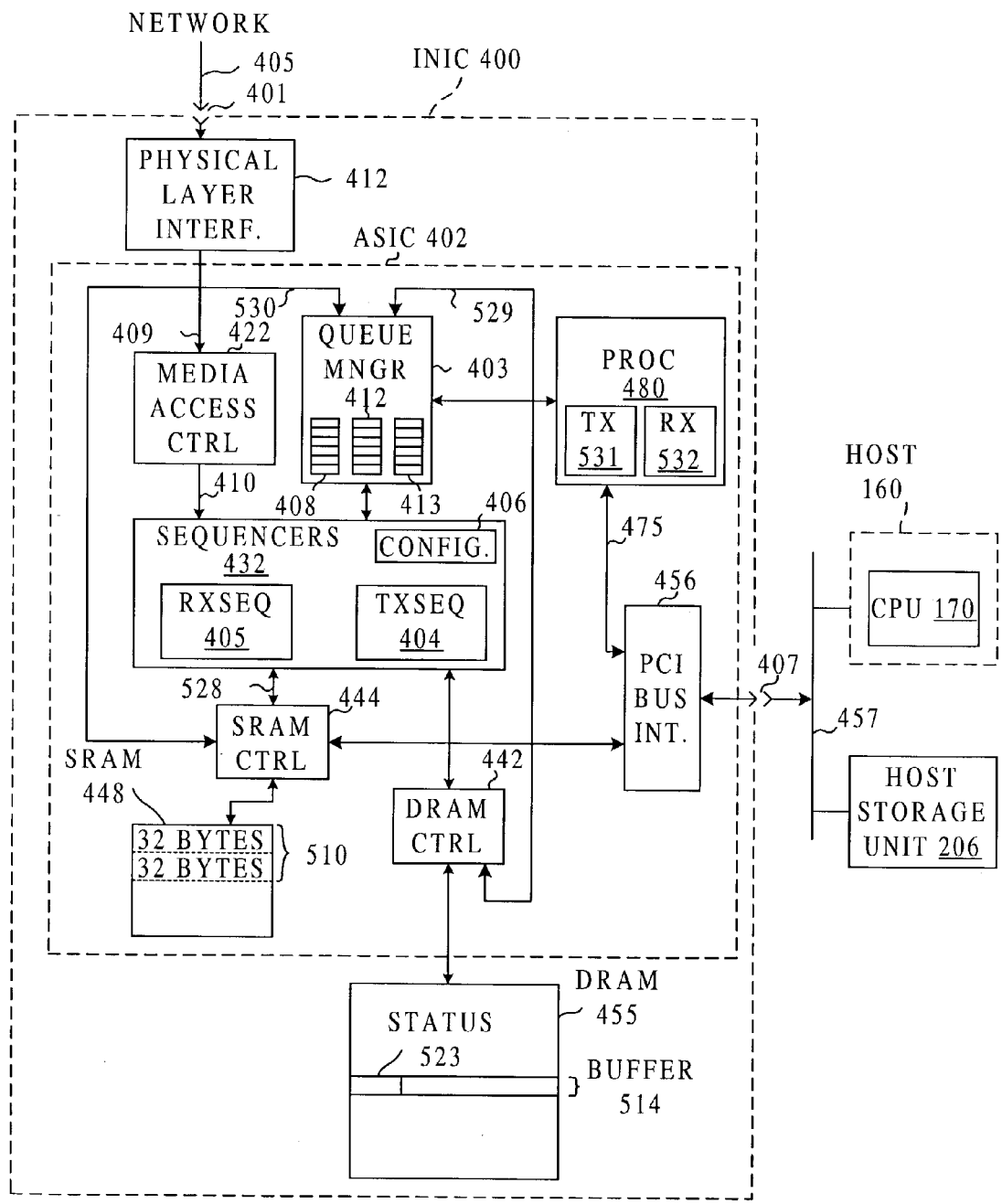
FIG. 14 shows an intelligent network interface card (INIC) that can be made and used in accordance with one embodiment of the present disclosure.

FIG. 14 shows an INIC 400 that can be made and used in accordance with one embodiment of the present disclosure, focusing in this description on a single network connection. INIC 400 includes PHY chip 412, ASIC chip 402 and DRAM 455. PHY chip 412 couples INIC card 400 to network line 405 via a network connector 401. INIC 400 may be coupled to the CPU of the host (for example, CPU 170 of host 160 of FIG. 10) via card edge connector 407 and PCI bus 457. ASIC chip 402 includes a Media Access Control (MAC) unit 422, a sequencers block 432, SRAM control 444, SRAM 448, DRAM control 442, a queue manager 403, a processor 480, and a PCI bus interface unit 456. Sequencers block 432 includes a transmit sequencer 404, a receive sequencer 405, and configuration registers 406. A MAC destination address is stored in configuration register 406. Part of the program code executed by processor 470 is contained in ROM (not shown) and part is located in a writeable control store SRAM (not shown). The program may be downloaded into the writeable control store SRAM at initialization from a host.

Figure 15:
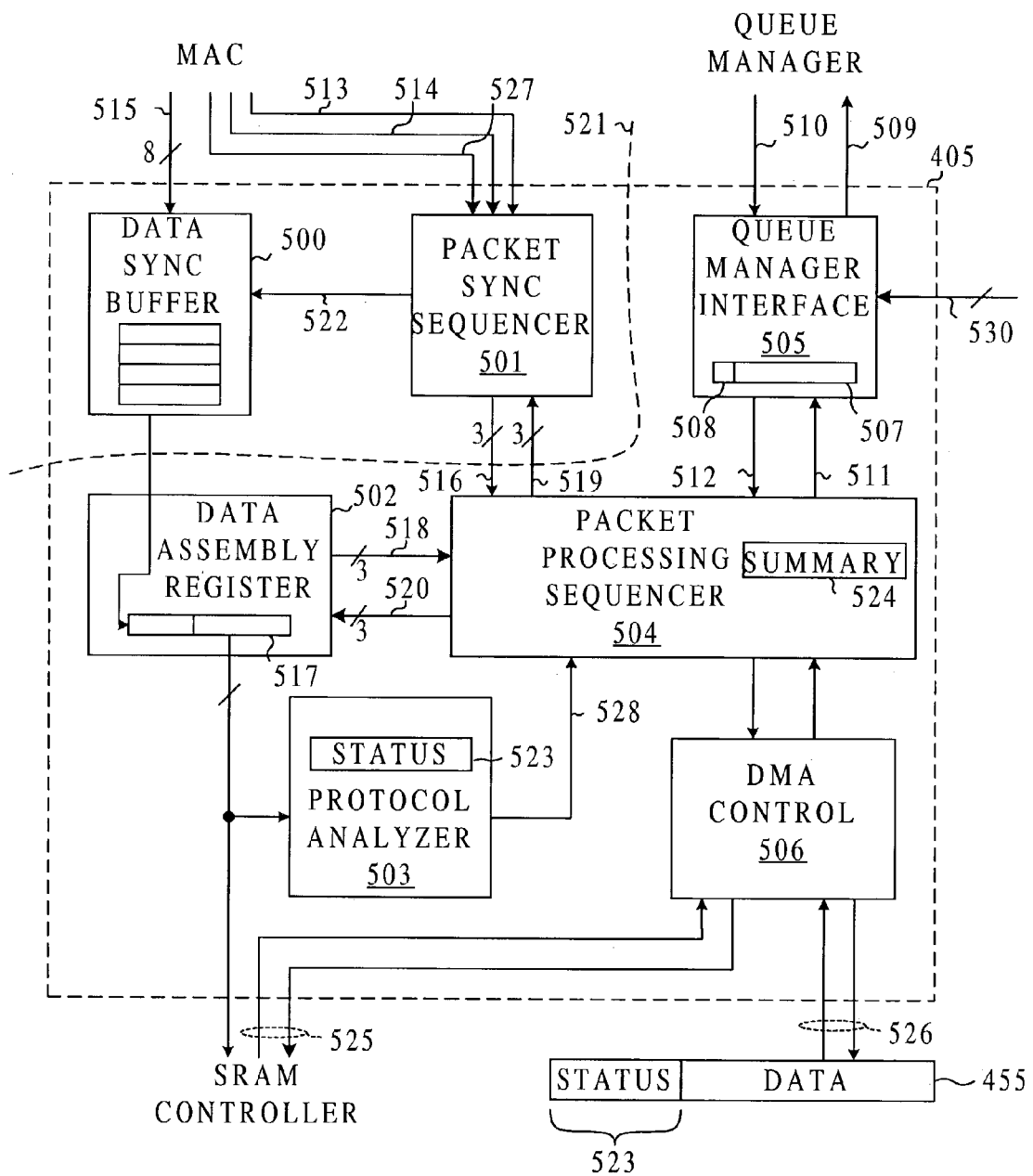
FIG. 15 is a more detailed diagram of the receive sequencer of FIG. 14.

FIG. 15 is a more detailed diagram of the receive sequencer 405 of FIG. 14. Receive sequencer 405 includes a data synchronization buffer 500, a packet synchronization sequencer 501, a data assembly register 502, a protocol analyzer 503, a packet processing sequencer 504, a queue manager interface 505, and a Direct Memory Access (DMA) control block 506. The packet synchronization sequencer 501 and data synchronization buffer 500 utilize a network-synchronized clock of MAC 422, whereas the remainder of the receive sequencer 405 utilizes a fixed-frequency clock. Dashed line 521 indicates the clock domain boundary.

Operation of receive sequencer 405 of FIGS. 23 and 24 is now described in connection with the receipt onto INIC 400 of a TCP/IP packet from network line 402. At initialization time, processor 480 partitions DRAM 455 into buffers. Receive sequencer 405 uses the buffers in DRAM 455 to store incoming network packet data as well as status information for the packet. Processor 480 creates a 32-bit buffer descriptor for each buffer. A buffer descriptor indicates the size and location in DRAM of its associated buffer. Processor 480 places these buffer descriptors on a "free-buffer queue" 408 by writing the descriptors to the queue manager 403. Queue manager 803 maintains multiple queues including the "free-buffer queue" 408. In this implementation, the heads and tails of the various queues are located in SRAM 448, whereas the middle portion of the queues are located in DRAM 455. In an alternative embodiment, a processor may be used instead of receive sequencer 405 and/or transmit sequencer 405, offering increased flexibility in protocol processing.

Lines 529 comprise a request mechanism involving a request line and address lines. Similarly, lines 530 comprise a request mechanism involving a request line and address lines. Queue manager 403 uses lines 529 and 530 to issue requests to transfer queue information from DRAM to SRAM or from SRAM to DRAM. In an alternative embodiment, such queues can be maintained entirely in either SRAM or DRAM, depending upon speed and cost considerations.

The queue manager interface 505 of the receive sequencer always attempts to maintain a free buffer descriptor 507 for use by the packet processing sequencer 504. Bit 508 is a ready bit that indicates that free-buffer descriptor 507 is available for use by the packet processing sequencer 504. If queue manager interface 505 does not have a free buffer descriptor (bit 508 is not set), then queue manager interface 505 requests one from queue manager 403 via request line 509. (Request line 509 is actually a bus that communicates the request, a queue ID, a read/write signal and data if the operation is a write to the queue.)

In response, queue manager 403 retrieves a free buffer descriptor from the tail of the "free buffer queue" 408 and then alerts the queue manager interface 505 via an acknowledge signal on acknowledge line 510. When queue manager interface 505 receives the acknowledge signal, the queue manager interface 505 loads the free buffer descriptor 507 and sets the ready bit 508. Because the free buffer descriptor was in the tail of the free buffer queue in SRAM 448, the queue manager interface 505 actually receives the free buffer descriptor 507 from the read data bus 528 of the SRAM control block 444. Packet processing sequencer 504 requests a free buffer descriptor 507 via request line 511. When the queue manager interface 505 retrieves the free buffer descriptor 507 and the free buffer descriptor 507 is available for use by the packet processing sequencer, the queue manager interface 505 informs the packet processing sequencer 504 via grant line 512. By this process, a free buffer descriptor is made available for use by the packet processing sequencer 504 and the receive sequencer 405 is ready to processes an incoming packet.

Next, a TCP/IP packet is received from the network line 405 via network connector 401 and Physical Layer Interface (PHY) 412. PHY 412 supplies the packet to MAC 422 via a Media Independent Interface (MII) parallel bus 409. MAC 422 begins processing the packet and asserts a "start of packet" signal on line 513 indicating that the beginning of a packet is being received. When a byte of data is received in the MAC and is available at the MAC outputs 515, MAC 422 asserts a "data valid" signal on line 514. Upon receiving the "data valid" signal, the packet synchronization sequencer 501 instructs the data synchronization buffer 500 via load signal line 522 to load the received byte from data lines 515. Data synchronization buffer 500 is four bytes deep. The packet synchronization sequencer 501 then increments a data synchronization buffer write pointer. This data synchronization buffer write pointer is made available to the packet processing sequencer 504 via lines 516. Consecutive bytes of data from data lines 515 are clocked into the data synchronization buffer 500 in this way.

A data synchronization buffer read pointer available on lines 519 is maintained by the packet processing sequencer 504. The packet processing sequencer 504 determines that data is available in data synchronization buffer 500 by comparing the data synchronization buffer write pointer on lines 516 with the data synchronization buffer read pointer on lines 519.

Data assembly register 502 contains a sixteen-byte long shift register 517. This register 517 is loaded serially a single byte at a time and is unloaded in parallel. When data is loaded into register 517, a write pointer is incremented. This write pointer is made available to the packet processing sequencer 504 via lines 518. Similarly, when data is unloaded from register 517, a read pointer maintained by packet processing sequencer 504 is incremented. This read pointer is available to the data assembly register 502 via lines 520. The packet processing sequencer 504 can therefore determine whether room is available in register 517 by comparing the write pointer on lines 518 to the read pointer on lines 520.

If the packet processing sequencer 504 determines that room is available in register 517, then packet processing sequencer 504 instructs data assembly register 502 to load a byte of data from data synchronization buffer 500. The data assembly register 502 increments the data assembly register write pointer on lines 518 and the packet processing sequencer 504 increments the data synchronization buffer read pointer on lines 519. Data shifted into register 517 is examined at the register outputs by protocol analyzer 503, which verifies checksums, and generates "status" information 523.

DMA control block 506 is responsible for moving information from register 517 to buffer 514 via a sixty-four byte receive FIFO 510. DMA control block 506 implements receive FIFO 510 as two thirty-two byte ping-pong buffers using sixty-four bytes of SRAM 448. DMA control block 506 implements the receive FIFO using a write-pointer and a read-pointer. When data to be transferred is available in register 517 and space is available in FIFO 510, DMA control block 506 asserts an SRAM write request to SRAM controller 444 via lines 525. SRAM controller 444 in turn moves data from register 517 to FIFO 510 and asserts an acknowledge signal back to DMA control block 506 via lines 525. DMA control block 506 then increments the receive FIFO write pointer and causes the data assembly register read pointer to be incremented.

When thirty-two bytes of data has been deposited into receive FIFO 510, DMA control block 506 presents a DRAM write request to DRAM controller 442 via lines 526. This write request consists of the free buffer descriptor 507 ORed with a "buffer load count" for the DRAM request address, and the receive FIFO read pointer for the SRAM read address. Using the receive FIFO read pointer, the DRAM controller 442 asserts a read request to SRAM controller 444. SRAM controller 444 responds to DRAM controller 442 by returning the indicated data from the receive FIFO 510 in SRAM 448 and asserting an acknowledge signal. DRAM controller 442 stores the data in a DRAM write data register, stores a DRAM request address in a DRAM address register, and asserts an acknowledge to DMA control block 506. The DMA control block 506 then decrements the receive FIFO read pointer. Then the DRAM controller 442 moves the data from the DRAM write data register to buffer 514. In this way, as consecutive thirty-two byte chunks of data are stored in SRAM 448, DRAM control block 506 moves those thirty-two byte chunks of data one at a time from SRAM 448 to buffer 514 in DRAM 455. Transferring thirty-two byte chunks of data to the DRAM 455 in this fashion allows data to be written into the DRAM using the relatively efficient burst mode of the DRAM.

Packet data continues to flow from network line 405 to buffer 514 until all packet data has been received. MAC 422 then indicates that the incoming packet has completed by asserting an "end of frame" (i.e., end of packet) signal on line 527 and by presenting final packet status (MAC packet status) to packet synchronization sequencer 501. The packet processing sequencer 501 then moves the status 523 (also called "protocol analyzer status") and the MAC packet status to register 517 for eventual transfer to buffer 514.

After all the data of the packet has been placed in buffer 514, status 523 and the MAC packet status is transferred to buffer 514 so that it is stored prepended to the associated data as shown in FIG. 14.

After all data and status has been transferred to buffer 514, packet processing sequencer 504 creates a summary 524 (also called a "receive packet descriptor") by concatenating the free buffer descriptor 507, the buffer load-count, the MAC ID, and a status bit (also called an "attention bit"). If the attention bit is a one, then the packet is not a "fast-path candidate"; whereas if the attention bit is a zero, then the packet is a "fast-path candidate". The value of the attention bit represents the result of a significant amount of processing that processor 480 would otherwise have to do to determine whether the packet is a "fast-path candidate". For example, the attention bit being a zero indicates that the packet employs both TCP protocol and IP protocol. By carrying out this significant amount of processing in hardware beforehand and then encoding the result in the attention bit, subsequent decision making by processor 480 as to whether the packet is an actual "fast-path packet" is accelerated.

Packet processing sequencer 504 then sets a ready bit (not shown) associated with summary 524 and presents summary 524 to queue manager interface 505. Queue manager interface 505 then requests a write to the head of a "summary queue" 512 (also called the "receive descriptor queue"). The queue manager 403 receives the request, writes the summary 524 to the head of the summary queue 512, and asserts an acknowledge signal back to queue manager interface via line 510. When queue manager interface 505 receives the acknowledge, queue manager interface 505 informs packet processing sequencer 504 that the summary 524 is in summary queue 512 by clearing the ready bit associated with the summary. Packet processing sequencer 504 also generates additional status information (also called a "vector") for the packet by concatenating the MAC packet status and the MAC ID. Packet processing sequencer 504 sets a ready bit (not shown) associated with this vector and presents this vector to the queue manager interface 505. The queue manager interface 505 and the queue manager 403 then cooperate to write this vector to the head of a "vector queue" 413 in similar fashion to the way summary 524 was written to the head of summary queue 412 as described above. When the vector for the packet has been written to vector queue 413, queue manager interface 505 resets the ready bit associated with the vector.

Once summary 524 (including a buffer descriptor that points to buffer 514) has been placed in summary queue 412 and the packet data has been placed in buffer 514, processor 480 can retrieve summary 524 from summary queue 412 and examine the "attention bit".

If the attention bit from summary 524 is a digital one, then processor 480 determines that the packet is not a "fast-path candidate" and processor 480 need not examine the packet headers. Only the status 523 (first sixteen bytes) from buffer 514 are DMA transferred to SRAM so processor 480 can examine it. If the status 523 indicates that the packet is a type of packet that is not to be transferred to the host (for example, a multicast frame that the host is not registered to receive), then the packet is discarded (i.e., not passed to the host). If status 523 does not indicate that the packet is the type of packet that is not to be transferred to the host, then the entire packet (headers and data) is passed to a buffer on host 160 for "slow-path" transport and network layer processing by the protocol stack of host 160.

If, on the other hand, the attention bit is a zero, then processor 480 determines that the packet is a "fast-path candidate". If processor 480 determines that the packet is a "fast-path candidate", then processor 480 uses the buffer descriptor from the summary to DMA transfer the first approximately 96 bytes of information from buffer 514 from INIC DRAM 455 into a portion of SRAM 448 so processor 480 can examine it. This first approximately 96 bytes contains status 523 as well as the IP source address of the IP header, the IP destination address of the IP header, the TCP source address of the TCP header, and the TCP destination address of the TCP header. The IP source address of the IP header, the IP destination address of the IP header, the TCP source address of the TCP header, and the TCP destination address of the TCP header together uniquely define a single connection context (TCB) with which the packet is associated. Processor 480 examines these addresses of the TCP and IP headers and determines the connection context of the packet. Processor 480 then checks a list of connection contexts that are under the control of INIC 400 and determines whether the packet is associated with a connection context (TCB) under the control of INIC 400.

If the connection context is not in the list, then the "fast-path candidate" packet is determined not to be a "fast-path packet." In such a case, the entire packet (headers and data) is transferred to a buffer in host 160 for "slow-path" processing by the protocol stack of host 160. As discussed below, a partial CRC for the packet may also be transferred to the host for the situation in which the packet data is only a part of a data block on which a CRC is to be calculated.

If, on the other hand, the connection context is in the list, then software executed by processor 480 including software state machines 531 and 532 checks for one of numerous exception conditions and determines whether the packet is a "fast-path packet" or is not a "fast-path packet". These exception conditions may include: 1) IP fragmentation is detected; 2) an IP option is detected; 3) an unexpected TCP flag (urgent bit set, reset bit set, SYN bit set or FIN bit set) is detected; 4) the ACK field in the TCP header is before the TCP window, or the ACK field in the TCP header is after the TCP window, or the ACK field in the TCP header shrinks the TCP window; 5) the ACK field in the TCP header is a duplicate ACK and the ACK field exceeds the duplicate ACK count (the duplicate ACK count is a user settable value); and 6) the sequence number of the TCP header is out of order (packet is received out of sequence). If the software executed by processor 480 detects one of these exception conditions, which may vary depending upon the particular configuration, then processor 480 determines that the "fast-path candidate" is not a "fast-path packet." In such a case, the connection context for the packet is "flushed" (the connection context is passed back to the host) so that the connection context is no longer present in the list of connection contexts under control of INIC 400. The entire packet (headers and data) is transferred to a buffer in host 160 for "slow-path" transport layer and network layer processing by the protocol stack of host 160.

If, on the other hand, processor 480 finds no such exception condition, then the "fast-path candidate" packet is determined to be an actual "fast-path packet". The receive state machine 532 then processes of the packet through TCP. The data portion of the packet in buffer 514 is then transferred by another DMA controller (not shown in FIG. 14) from buffer 514 to a host-allocated file cache 164 in memory 173 of host 160. In one embodiment, host 160 does no analysis of the TCP and IP headers of a "fast-path packet". All analysis of the TCP and IP headers of a "fast-path packet" is done on INIC card 400.

Figure 16:
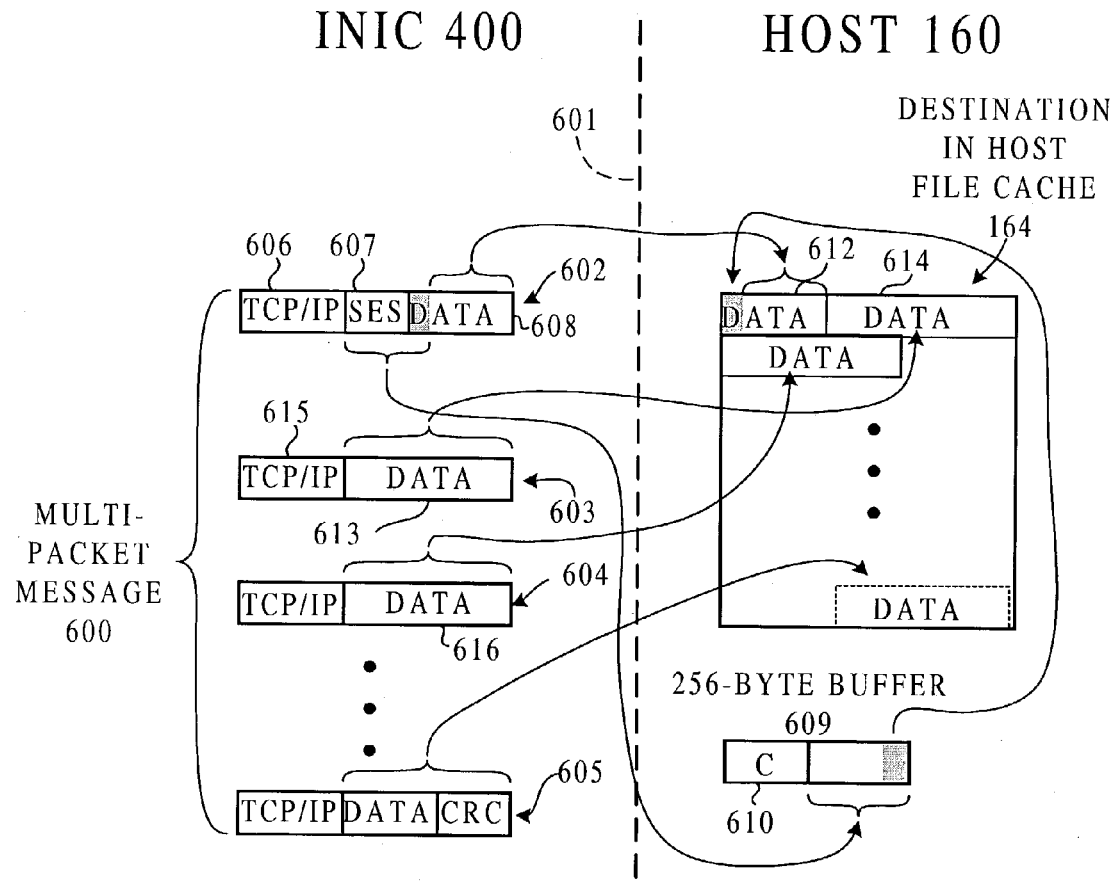
FIG. 16 is a diagram illustrating the transfer of data of fast-path packets from the INIC to host of FIG. 10.

FIG. 16 is a diagram illustrating the transfer of data of "fast-path packets" (packets of a 64 k-byte session layer message 600) from INIC 400 to host 160. The portion of the diagram to the left of the dashed line 601 represents INIC 400, whereas the portion of the diagram to the right of the dashed line 601 represents host 160. In other embodiments such data may be moved by a CPD disposed in one part of a host to a destination disposed in another part of the host, or from a receive buffer on an INIC to a file cache on the INIC.

The 64 k-byte session layer message 600 includes approximately forty-five packets, four of which (602, 603, 604 and 605) are labeled on FIG. 16. The first packet 602 includes a portion 606 containing transport and network layer headers (for example, TCP and IP headers), a portion 607 containing a session layer header, and a portion 608 containing data. The last packet 605 may contain a 32 bit iSCSI CRC for the situation in which iSCSI data is being received. The data for that packet may be padded to the next 4-byte boundary prior to appending the CRC remainder, which may also be known as a data digest.

In a first step, portion 607, at least a first few bytes of data from portion 608, and the connection context identifier 610 of the packet 600 may be transferred from TNIC 400 to a 256-byte buffer 609 in host 160. The transfer is performed by DMA unit 506 that can access INIC memory and buffer 609 via respective memory controllers. A partial CRC has been calculated for data portion 608 as described below.

In a second step, host 160 examines this information and returns to INIC 400 a destination (for example, the location of a file cache 164 in host memory 173) for the data. For the situation in which the data is received in response to an iSCSI read request such a destination may accompany the data, having been allocated at the time of the request, so that the host does not need to determine the destination upon receiving the data. Remote Direct Memory Access (RDMA) message packets may similarly provide such a preallocated destination.

Host 160 also copies the first few bytes of the data from buffer 609 to the beginning of a first part 612 of file cache 164. In a third step, INIC 400 transfers the remainder of the data from portion 608 to host 160 such that the remainder of the data is stored in the remainder of first part 612 of file cache 164. No network, transport, or session layer headers are stored in first part 612 of file cache 164. Next, the data portion 613 of the second packet 603 is acquired by DMA unit and a CRC calculation is performed on that data portion 613 that has been seeded with the CRC of the previous data portion 608. The DMA unit then transfers data portion 613 to host 160 such that the data portion 613 of the second packet 603 is stored in a second part 614 of file cache 164. The transport layer and network layer header portion 615 of second packet 603 is not transferred to host 160. There is no network, transport, or session layer header stored in file cache 164 between the data portion of first packet 602 and the data portion of second packet 603.

Similarly, the data portion 616 of the next packet 604 of the session layer message is seeded with the CRC remainder from data portion 613, and another partial CRC is performed. Data portion 616 is then transferred to file cache 164 so that there is no network, transport, or session layer headers between the data portion of the second packet 603 and the data portion of the third packet 604 in file cache 164. In this way, only the data portions of the packets of the session layer message are placed in the file cache 164. The data from the session layer message 600 is present in file cache 164 as a block such that this block contains no network, transport, or session layer headers. When all of the data portions of a fast-path message have been processed by the CRC calculator, the resulting CRC is compared with that which was received with the message to assure data integrity.

Figure 17:
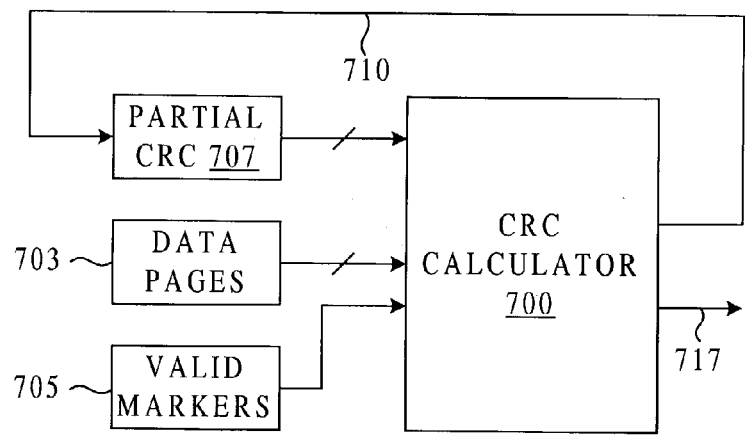
FIG. 17 is a diagram illustrating the calculation of partial CRC remainders by a CRC calculator.

FIG. 17 shows a CRC calculator 700, which may be disposed in DRAM memory controller 442, DMA controller 506 or adjacent to one or both of the controllers 506 and 710. CRC calculator 700 may include logic that performs CRC calculations on multiple bits or bytes in parallel, and performs CRC calculations for fast-path packets differently from CRC calculations for slow-path packets. In the example shown, data pages 703 are pulled 8 bytes (64 bits) at a time from DRAM and entered into CRC calculator 700, which contains multiple XOR gates arranged to compute a partial CRC remainder for the 8 bytes using a 32 bit polynomial divisor. This process continues until all the data from a packet has been processed by the CRC calculator 700 to form a partial CRC for the packet. The data portion of the packet typically ranges up to about 1400 bytes per packet, as indicated by valid markers 705 that accompany the data.

For the fast-path case, as indicated by arrow 710, a 32 bit partial CRC 707 from one packet is fed back into CRC calculator 700 to seed a CRC calculation for the following packet. The data from the fast-path packet is sent by DMA controller 442 to the destination, such as a file cache location, as shown by arrow 717. A CRC remainder that is calculated from plural fast-path packets is compared with the CRC that was included with the last fast-path packet to assure data integrity. This comparison may be performed by the CRC calculator 700, a host or INIC processor, or separate comparator logic.

For the slow-path case, data portion CRCs are calculated as described above and sent to the host as shown by arrow 717, for instance appended to their corresponding packet. This allows the packets to be forwarded to the host for slow path processing, rather than accumulated on the INIC until all packets of a message have been received and reordered. Calculating the partial CRCs with the CRC calculator off-loads much of the CRC processing from the host. The host then performs protocol processing on the packets, including weighting the partial CRCs to calculate a CRC for the message. For the situation in which messages corresponding to many connections are being processed, calculation of partial CRCs can save valuable memory space compared to accumulating the full messages on the INIC.

Although we have focused on teaching the preferred embodiments of an improved error detection system, other embodiments and modifications of this invention will be apparent to persons of ordinary skill in the art in view of these teachings. Therefore, this invention is limited only by the following claims, which include all such embodiments and modifications when viewed in conjunction with the above specification and accompanying drawings.

Appendix A

```
unsigned int polynomial = 0x1EDC6F41;
unsigned int CalculateCRC (Fragment1, Fragment2, TableValue)
    unsigned int Fragment1;
    unsigned int Fragment2;
    unsigned int TableValue;
{
    unsigned int i, Crc, TableNext, Mask;
    TableNext = TableValue;
    Crc = Fragment2;
    Mask = 1;
    for (i = 0; i <32; i++) {
        if (Mask & Fragment1) Crc = Crc ^ TableNext;
        TableNext = (TableNext << 1) ^ ( (TableNext
            & 0x80000000) ? polynomial : 0);
        Mask = Mask << 1;
    }
    return (Crc);
}
```

Appendix B

```
// add 2 partial crcs into a 32 bit crc
// inputs are the partial crcs, and a value from a
// table lookup according to the length in 32 bit words
// of the data covered by the second crc.
// the polynomial is expressed as a 32 bit value
// e.g for
//   polynomial:   x**32 +
//                 x**26 +
//                 x**23 +
//                 x**22 +
//                 x**16 +
//                 x**12 +
//                 x**11 +
//                 x**10 +
//                 x**8 +
//                 x**7 +
//                 x**5 +
//                 x**4 +
//                 x**2 +
//                 x**1 +
//                 x**0
//   polynomial is 32'h04c11db7 (x**32 is assumed)
module add_crcs (partialcrc1,
                 partialcrc2,
                 table0,
                 new_crc );
input    [31:0] partialcrc1;
input    [31:0] partialcrc2;
input    [31:0] table0;
output   [31:0] new_crc;
parameter polynomial = 32'h1EDC6F41;
reg      [31:0] ntable;
reg      [31:0] new_crc;
integer         i;
always @ (partialcrc1 or partialcrc2 or table0) begin
    ntable = table0;          // start with the first
    value
        new_crc = partialcrc2;
    for (i = 0; i < 32; i = i+1) begin
        if (partialcrc1[i]) new_crc = new_crc ^ ntable;
        ntable = (ntable << 1) ^ (ntable[31] ? polynomial : 0);
    end
end
endmodule
// crc rom - look up first table value for crc
//
//   polynomial:   x**32 +
//                 x**26 +
//                 x**23 +
//                 x**22 +
//                 x**16 +
//                 x**12 +
//                 x**11 +
//                 x**10 +
//                 x**8 +
//                 x**7 +
```

-continued

```
//                   x**5 +
//                   x**4 +
//                   x**2 +
//                   x**1 +
//                   x**0
//      polynomial is 32'h04c11db7 (x**32 is assumed)
module crc_rom (address, crc);
input [13:0] address;
output [31:0] crc;
reg [31:0] crc_table [16383:0];
reg [31:0] crc;
// read the rom
always @ (address)
     crc = crc_table[address];
     // initialize the rom
     reg [31:0] pcrc;
     integer i, j;
     parameter [31:0] polynomial = 32'h1EDC6F41;
     initial begin
     crc_table[0] = 0;
     pcrc = 1;
     for (j=1; j <16384; j = j+1) begin
          for (i= 0; i < 32; i = i+1) begin
               pcrc = (pcrc << 1) ^ (pcrc[31] ? polynomial : 0);
          end
          crc_table[j] = pcrc;
     end
end
endmodule
```

The invention claimed is:

1. A method for receiving data by a host and an interface device, the method comprising:
receiving, by the interface device, a plurality of data portions that form a message when concatenated;
dividing, by the interface device, each of the portions by a divisor to create a portion remainder corresponding to each of the portions;
weighting, by the host, the portion remainders by factors based on dividing a length of the message data following the corresponding portion by the divisor, to form a plurality of weighted portion remainders;
adding, by the host, the weighted portion remainders to form a sum; and
dividing, by the host, the sum by the divisor to determine a remainder for the message.

2. The method of claim 1, further comprising calculating at least one of the factors by dividing the length by the divisor to obtain a length remainder.

3. The method of claim 1, wherein weighting the portion remainders by factors includes retrieving the factors from a table.

4. The method of claim 1, wherein weighting the portion remainders includes multiplying by the corresponding factors.

5. The method of claim 1, further comprising comparing the remainder for the message with a predetermined remainder.

6. The method of claim 1, further comprising determining whether the data portions are in a correct order to form the message when concatenated, prior to weighting the portion remainders by corresponding length remainders.

7. The method of claim 1, wherein the divisor is a polynomial.

8. The method of claim 1, wherein each of the remainders is a polynomial.

9. The method of claim 1, further comprising comparing the message remainder to a data digest.

10. A method for detecting errors, the method comprising:
receiving a plurality of portions in a first sequence that, when arranged in a second sequence, form a message;
determining whether the first sequence is identical to the second sequence; and
choosing, based at least in part upon whether the first sequence is identical to the second sequence, whether to perform a cyclic redundancy check in accordance with a first process or in accordance with a second process.

11. The method of claim 10, further comprising at least one of:
performing the cyclic redundancy check in accordance with the first process when the first sequence is identical to the second sequence; and
performing the cyclic redundancy check in accordance with the second process when the first sequence is not identical to the second sequence.

12. The method of claim 10, wherein determining whether the first sequence is identical to the second sequence includes performing Transmission Control Protocol (TCP) processing on a plurality of headers that correspond to the plurality of portions.

13. The method of claim 10, wherein at least one of the first and second processes includes computing a cyclic redundancy calculation on at least one of the portions, including dividing a numerical value corresponding to the portion by a divisor to determine a remainder corresponding to the one portion.

14. The method of claim 13, wherein the first sequence is identical to the second sequence, and the first process includes:
prepending a portion consecutive to the one portion with the remainder to form a seeded portion; and
computing a cyclic redundancy calculation on the seeded portion.

15. The method of claim 13, wherein the first sequence is not identical to the second sequence, and the second process includes:
weighting the remainder according to a position of the one portion relative to a consecutive portion in the message, thereby creating a weighted remainder for the one portion; and
computing a cyclic redundancy calculation on the weighted remainder.

16. The method of claim 10, wherein the first sequence is not identical to the second sequence, and the second process includes:
computing a cyclic redundancy calculation on each of the portions, including dividing a numerical value corresponding to each said portion by a divisor to determine a partial remainder corresponding to each said portion;
weighting each partial remainder according to a factor remainder that is based on a position of the corresponding portion relative to at least one subsequent portion in the message, thereby creating a weighted remainder for each said portion.

17. The method of claim 16, wherein weighting each partial remainder according to a factor remainder includes multiplying each partial remainder by a remainder resulting from a cyclic redundancy calculation for a degree of the corresponding portion.

18. The method of claim 16, wherein weighting each partial remainder according to a factor remainder includes multiplying the partial remainder by a factor determined from a table.

19. The method of claim 10, further comprising concatenating the message to form a block of data.

20. The method of claim 10, further comprising receiving, with one of the portions, a data digest for the message.

21. A method for detecting errors, the method comprising:
receiving a plurality of portions in a first sequence that, when arranged in a second sequence, form a message;
performing a cyclic redundancy calculation on each of the portions to obtain a partial remainder corresponding to each of the portions;
determining whether the first sequence is identical to said second sequence; and
choosing, based upon whether the first sequence is identical to the second sequence, whether to perform a cyclic redundancy check in accordance with a first process or in accordance with a second process.

22. The method of claim 21, wherein determining whether the first sequence is identical to the second sequence includes performing Transmission Control Protocol (TCP) processing on a plurality of headers that correspond to the plurality of portions.

23. The method of claim 21, further comprising at least one of:
performing said cyclic redundancy check in accordance with the first process by seeding the partial remainders when the first sequence is identical to the second sequence; and
performing said cyclic redundancy check in accordance with the second process by weighting the partial remainders when the first sequence is not identical to said second sequence.

24. The method of claim 21, wherein the first sequence is identical to said second sequence, and the first process includes:
prepending a portion consecutive to the one portion with the remainder to form a seeded portion; and
computing a cyclic redundancy calculation on the seeded portion.

25. The method of claim 24, wherein the first sequence is not identical to the second sequence, and the second process includes:
weighting the remainder according to a position of the one portion relative to a consecutive portion in the message, thereby creating a weighted remainder for said one portion; and
computing a cyclic redundancy calculation on said weighted remainder.

26. The method of claim 21, wherein said message is a block of data.

27. The method of claim 21, wherein said cyclic redundancy check is part of a data digest.

28. A method for detecting errors by a first device and a second device, the method comprising:
receiving, by the first device, a plurality of portions in a first sequence that, when arranged in a second sequence, form a message;
computing, by the first device, a cyclic redundancy calculation on each of the portions, including dividing a numerical value corresponding to each said portion by a divisor to determine a remainder corresponding to each said portion,
weighting, by the second device, at least one of the remainders by a factor that is based on dividing a length of at least one portion subsequent to the corresponding portion by the divisor, thereby creating a weighted remainder for the portions;
adding, by the second device, the weighted remainders for the portions to obtain a sum of the weighted remainders;
dividing, by the second device, the sum by the divisor to obtain a cyclic redundancy remainder of the portions; and
comparing, by the second device, the cyclic redundancy remainder of the portions with a cyclic redundancy check accompanying one of the portions to determine whether the message has an error.

29. The method of claim 28, further comprising determining, prior to the weighting, that the first sequence is different than the second sequence.

30. The method of claim 28, wherein weighting at least one of the remainders by a factor includes retrieving the factor from a table.

31. The method of claim 28, wherein computing the cyclic redundancy calculation is performed on the portions prior to said weighting each said remainder.

32. The method of claim 28, wherein dividing said sum by said divisor to obtain a cyclic redundancy calculation of said subsequent portion is performed prior to adding said weighted remainders of all of said portions.

33. The method of claim 28, wherein adding said weighted remainders of said consecutive portions is performed on all of said remainders prior to said dividing said sum by said divisor.

34. The method of claim 28, wherein weighting each said remainder according to a position of its corresponding portion includes weighting each said remainder by a factor determined from a table.

35. The method of claim 28, wherein said first sequence is different than said second sequence.

36. The method of claim 28, wherein said divisor is a polynomial.

37. The method of claim 28, wherein said message is a block of data.

38. The method of claim 28, wherein said cyclic redundancy check is part of a data digest.

39. A method for detecting errors by a host and an interface device, the method comprising:
creating, for a series of numbers each representative of a consecutive order of magnitude, a series of factors each representing a remainder resulting from dividing one of the numbers by a divisor to obtain a remainder;
receiving, by the interface device, a plurality of segments in a first sequence that, when arranged in a second sequence, form a message;
computing, by the interface device, a cyclic redundancy calculation on at least one of the segments, including dividing a numerical value corresponding to the segment by the divisor to determine a remainder corresponding to the segment; and
multiplying, by the host, the segment remainder by a factor corresponding to the order of magnitude of the segment, thereby creating a weighted remainder for the segment.

40. The method of claim 39, further comprising computing a cyclic redundancy calculation on one other of the segments to obtain a partial remainder of the other segment, and adding the partial remainder to the weighted remainder.

41. The method of claim 39, further comprising determining that the first sequence is not identical to the second sequence, prior to the weighting.

42. The method of claim 39, further comprising:
receiving a plurality of parts in a third sequence that, when arranged in a fourth sequence, form a second message;
computing a cyclic redundancy calculation on at least one of the parts, including dividing a numerical value corresponding to the one part by the divisor to determine a partial remainder corresponding to the one part;
prepending the partial remainder to a part that is consecutive to the one part in the message, thereby forming a seeded consecutive part; and
computing a cyclic redundancy calculation on the seeded consecutive part.

43. The method of claim 39, further comprising determining that the third sequence is identical to the fourth sequence, prior to the prepending.

44. The method of claim 39, further comprising retrieving the factor from a table, prior to multiplying the segment remainder by the factor.

45. The method of claim 39, wherein the divisor is a polynomial.

46. The method of claim 39, wherein the message is a block of data.

47. The method of claim 39, further comprising receiving an iSCSI header along with the plurality of segments.

48. A method for detecting errors by a host and an interface device, the method comprising:
receiving, by the interface device, a plurality of portions in a first sequence that, when arranged in a second sequence, form a message;
computing, by the interface device, a cyclic redundancy check on each of the portions, including dividing a numerical value corresponding to each said portion by a divisor to determine a partial remainder corresponding to each said portion;
weighting, by the host, the partial remainder corresponding to a first portion of the second sequence by a remainder resulting from dividing by the divisor a degree of the first portion within the message to create a first weighted remainder,
adding the first weighted remainder to a remainder corresponding to the second portion to obtain a weighted sum of partial remainders;
dividing the sum by said divisor to obtain an overall remainder for the portions; and
comparing said overall remainder with a cyclic redundancy check prepended to one of said portions to determine whether said message has an error.

* * * * *

UNITED STATES PATENT AND TRADEMARK OFFICE
CERTIFICATE OF CORRECTION

PATENT NO. : 7,185,266 B2
APPLICATION NO. : 10/367147
DATED : February 27, 2007
INVENTOR(S) : Blightman et al.

It is certified that error appears in the above-identified patent and that said Letters Patent is hereby corrected as shown below:

In column 24, line 28, claim 13, the word "determine" is misspelled as "detennine", claim 13 should read:

13. The method of claim 10, wherein at least one of the first and second processes includes computing a cyclic redundancy calculation on at least one of the portions, including dividing a numerical value corresponding to the portion by a divisor to determine a remainder corresponding to the one portion.

Signed and Sealed this

Twenty-seventh Day of May, 2008

JON W. DUDAS
*Director of the United States Patent and Trademark Office*